United States Patent
Tan et al.

(10) Patent No.: US 9,521,685 B2
(45) Date of Patent: Dec. 13, 2016

(54) CIRCUIT ARRANGEMENT AND METHOD OF DETERMINING A PRIORITY OF PACKET SCHEDULING

(71) Applicants: Agency for Science, Technology and Research, Singapore (SG); Huawei International PTE., Ltd., Shanghai (CN)

(72) Inventors: Peng Hui Tan, Singapore (SG); Jinghong Zheng, Singapore (SG); Sumei Sun, Singapore (SG); Zhengguo Li, Singapore (SG); Kedi Wu, Shanghai (CN); Yuejun Wei, Shanghai (CN)

(73) Assignees: Agency for Science, Technology and Research, Singapore (SG); Huawei International PTE., Ltd., Shanghai (CN)

( * ) Notice: Subject to any disclaimer, the term of this patent is extended or adjusted under 35 U.S.C. 154(b) by 30 days.

(21) Appl. No.: 14/430,283

(22) PCT Filed: Sep. 21, 2012

(86) PCT No.: PCT/SG2012/000348
§ 371 (c)(1),
(2) Date: Jul. 22, 2015

(87) PCT Pub. No.: WO2014/046610
PCT Pub. Date: Mar. 27, 2014

(65) Prior Publication Data
US 2015/0250001 A1    Sep. 3, 2015

(51) Int. Cl.
*H04W 72/12* (2009.01)
*H04L 29/06* (2006.01)
(Continued)

(52) U.S. Cl.
CPC ...... *H04W 72/1242* (2013.01); *H04L 47/2408* (2013.01); *H04L 47/2458* (2013.01);
(Continued)

(58) Field of Classification Search
CPC .................... H04W 47/1242; H04W 47/1231; H04L 47/2408; H04L 47/2458; H04L 65/4069; H04L 65/607; H04L 65/80; H04L 47/14; H04N 19/127; H04N 19/164; H04N 19/172; H04N 19/177; H04N 21/23106; H04N 21/8455; H04N 21/6131
(Continued)

(56) References Cited

U.S. PATENT DOCUMENTS 5,125,671 A * 6/1992 Ueda ........................ A63F 13/00
345/536
7,876,821 B2 * 1/2011 Li ........................ H04N 19/159
375/240.12
(Continued)

*Primary Examiner* — Afsar M Qureshi
(74) *Attorney, Agent, or Firm* — K. David Crockett, Esq.; Niky Economy Syrengelas, Esq.; Crockett & Crockett, PC

(57) ABSTRACT

The present invention is a circuit arrangement for a wireless cellular network. The circuit arrangement includes a determiner configured to determine a priority value of each packet of a plurality of packets based on at least a position of a video frame in a group of pictures and a type of the video frame, the video frame or a part thereof being contained in the packet, wherein the type of video frame comprises I frame data or P frame data; and wherein the determiner is further configured to set the priority value of a packet including I frame data lower than the priority value of at least one other packet including P frame data; and a controller configured to control scheduling of the packet based on the determined priority value for a communication device in a wireless cellular network. A method of determining a priority of packet scheduling is also disclosed.

20 Claims, 18 Drawing Sheets

(51) Int. Cl.
   *H04N 21/231*   (2011.01)
   *H04N 21/845*   (2011.01)
   *H04L 12/851*   (2013.01)
   *H04N 19/127*   (2014.01)
   *H04N 19/164*   (2014.01)
   *H04N 19/172*   (2014.01)
   *H04N 19/177*   (2014.01)
   *H04L 12/833*   (2013.01)
   *H04N 21/61*    (2011.01)
   *H04L 12/801*   (2013.01)

(52) U.S. Cl.
   CPC ........ *H04L 65/4069* (2013.01); *H04L 65/607* (2013.01); *H04L 65/80* (2013.01); *H04N 19/127* (2014.11); *H04N 19/164* (2014.11); *H04N 19/172* (2014.11); *H04N 19/177* (2014.11); *H04N 21/23106* (2013.01); *H04N 21/8455* (2013.01); *H04W 72/1231* (2013.01); *H04L 47/14* (2013.01); *H04N 21/6131* (2013.01)

(58) Field of Classification Search
   USPC ........................................................ 370/329
   See application file for complete search history.

(56)         References Cited

U.S. PATENT DOCUMENTS

2005/0094645 A1*   5/2005   Sridhar ............... H04L 12/5693
                                                370/395.42
2007/0002750 A1*   1/2007   Sang ................. H04W 72/1236
                                                370/238
2007/0019599 A1*   1/2007   Park .................... H04L 12/5693
                                                370/338
2007/0280260 A1*  12/2007   Ryu ................. H04W 72/1236
                                                370/395.4
2014/0036999 A1*   2/2014   Ryu ....................... H04N 19/50
                                                375/240.12

* cited by examiner

CIRCUIT ARRANGEMENT AND METHOD OF DETERMINING A PRIORITY OF PACKET SCHEDULING

TECHNICAL FIELD

Various embodiments generally relate to the field of packet scheduling in a wireless cellular network, in particular, in a Long Term Evolution (LTE) network.

BACKGROUND

There is an increasing interest in multimedia applications such as video services and Voice over IP (VoIP) in the Internet, which requires higher data rates and stricter quality of service (QoS) constraints. The need for a ubiquitous access to these multimedia services is driving the evolution of cellular networks. 3GPP Long Term Evolution (LTE) was introduced to meet this ever growing demand and the increasing performance requirement for packet-based cellular broadband systems.

LTE uses orthogonal frequency division multiple access (OFDMA) in the downlink. OFDMA divides the frequency bands into a group of orthogonal subcarriers or resource block (RB) and allocates these resource blocks to users based on their requirements, system load and system configuration. Packet scheduling is responsible for the selection of users and transmission of their packets such that the radio resources are efficiently utilized and the users' QoS requirements are satisfied.

Video streaming is one of the real time (RT) services that need to be supported in the LTE system. Conventionally, to ensure that the QoS requirements of video streaming users are guaranteed, the packet loss rate (PLR) has to be kept below a threshold. Once the video decoding process starts, the packets should be received within its delay threshold; otherwise the packets are discarded and hence considered as lost packets. In this sense, granting bounded delivery delays actually means lowering packet losses. There may be a need to schedule users whose delays are becoming large but whose current channel is not the most favorable.

Due to the limited data-rate capacity of a radio-frequency channel and the time-varying nature of wireless channel, radio resource management, especially packet scheduling is crucial for wireless networks. To improve the efficiency, packet scheduling has emphasized on obtaining the required QoS while exploiting the time varying characteristics of the wireless channel by using cross-layer scheduling algorithms. Moreover, to improve performance further, there are algorithms that consider the media content.

There are many packet scheduling algorithms developed for satisfying the delay constraint requirements. These scheduling algorithms are mainly proposed for single carrier wireless systems. In these schedulers, each connection or flow is assigned a priority value based on certain criterion, and the flow with the highest priority is scheduled at each Transmission Time Interval (TTI). Scheduling algorithms designed specifically for multi-carrier wireless systems, e.g., OFDMA, are also available, but they generally require higher computational complexity.

The performances of several conventional schedulers for video streaming have been compared. In these algorithms, the QoS of the received video is measured only in terms of the packet delay, or packet loss rate. Simulation outcomes show that, in the downlink LTE system supporting video streaming services, maximum-largest weighted delay first (LD) algorithm outperforms other packet scheduling algorithms by providing a higher system throughput, supporting a higher number of users and guaranteeing fairness at a satisfactory level.

To achieve better performance, there are scheduling algorithms which consider the media content or more specifically, the video content. In these algorithms, a value of importance based on the video content is assigned to each video packet in order to account for the video perceptual quality or contribution to the distortion. The importance assignment is frame based, which does not take into the consideration of the packetization. Each video frame is usually packetized into several video packets. The packet importance is then used to determine its scheduling decision to allocate resource among the users.

The expected distortion of the received video sequence may be minimized in another algorithm. The expected distortion is used to order the video packets in the transmission queue of each user, and then gradients of the expected distortion are used to efficiently allocate resources across users. The scheduler employs a per-pixel decoder distortion estimation, which requires fully decoding of the compressed video streams.

Instead of per-pixel decoder distortion estimation, a utility function based on distortion may be used in conjunction with the gradient-based scheduling algorithm to enable content-aware resource allocation across multiple users. The utility function accounts for the dependencies between video packets and the effect that each video packet has on the final quality of the received video frame.

To avoid the decoding of video streaming before scheduling, other less complex algorithms are proposed. For example, in one of these algorithms, the position of the video frame in a group of pictures (GOP) is used to determine the importance of video packets for each user. The frame priority index (FPI) of the frame, which may be viewed as an inverse of the importance level, is simply set to be equal to the position of the frame within the GOP, i.e., the FPI for I frame is one and the FPI of the first P frame is two. The scheduling decision is then based on channel conditions, buffer emptiness, frame type and multiplexing. To have more accurate description of the video content, the motion information in the video frames may be used to determine the packet importance. The motion information may be extracted directly from the video stream without decoding of the video flow completely. However, this requires the video frames to arrive sequentially and free of errors.

Thus, there is a need to provide a packet scheduling algorithm seeking to address at least the above mentioned problems and outperform current techniques.

SUMMARY OF THE INVENTION

In a first aspect, the present invention relates to a circuit arrangement for a wireless cellular network. The circuit arrangement includes a determiner configured to determine a priority value of each packet of a plurality of packets based on at least a position of a video frame in a group of pictures (GOP) and a type of the video frame, the video frame or a part thereof being contained in the packet, wherein the type of video frame includes I frame data or P frame data; and wherein the determiner is further configured to set the priority value of a packet including I frame data lower than the priority value of at least one other packet including P frame data; and a controller configured to control scheduling of the packet based on the determined priority value for a communication device in a wireless cellular network.

In a second aspect, the present invention relates to a method of determining a priority of packet scheduling in a wireless cellular network. The method includes determining a priority value of each packet of a plurality of packets based on at least a position of a video frame in a group of pictures (GOP) and a type of the video frame, the video frame or a part thereof being contained in the packet, wherein the type of video frame includes I frame data or P frame data; and wherein determining the priority value further including setting the priority value of a packet including I frame data lower than the priority value of at least one other packet including P frame data; and controlling scheduling of the packet based on the determined priority value for a communication device in a wireless cellular network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features/elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Figure 1:
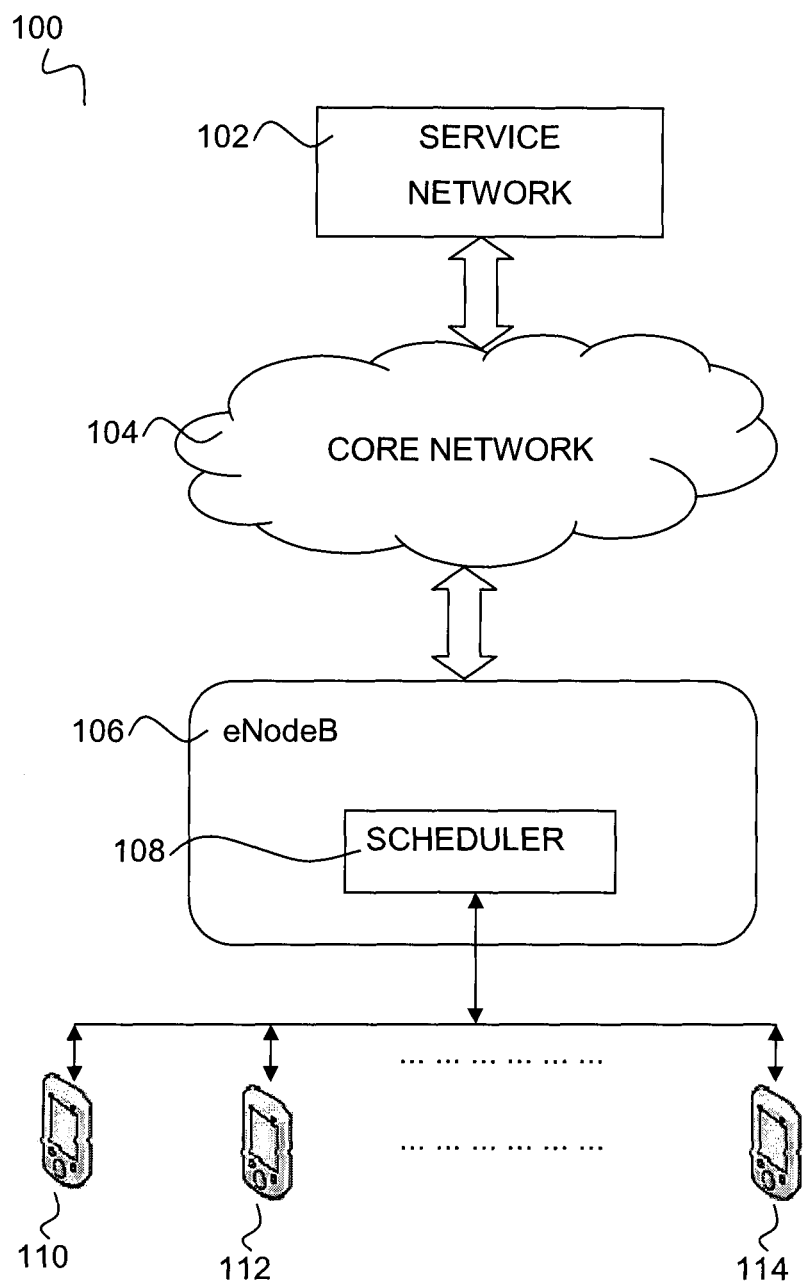
FIG. 1 shows a schematic block diagram of an overview of a communication system operating based on the LTE communication standard, in accordance to various embodiments.

Long Term Evolution (LTE) has been designed to support only packet-switched services. It aims to provide seamless Internet Protocol (IP) connectivity between user equipment (UE) and the packet data network (PDN), without any disruption to the end users' applications during mobility. FIG. 1 shows an overview of a communication system 100 operating based on the LTE communication standard. In FIG. 1, the communication system 100 includes a service network 102 in communication with a core network 104 which in turn communicates with user equipments 110, 112, 114 via a eNodeB 106. The service network 102 may be, for example, the Internet or a network providing VoIP services. The eNodeB 106 includes a scheduler 108 having a scheduling algorithm by which threads, processes or data flows are given access to system resources (e.g. processor time, communications bandwidth). Scheduling is usually done to load balance a system effectively or achieve a target quality of service (QoS).

Various embodiments provide packet scheduling for video streaming in mixed traffic flows over LTE networks. The packet scheduling may be performed by the scheduler 108 of FIG. 1.

Due to the out-of-sequence arrival and loss of packets at the medium access control (MAC) layer, it is difficult to extract motion and mode information of a video flow. It is also impossible to get the distortion contribution of the packet in the MAC layer, unless this information is included the packet. This information is not present in the LTE standard. Hence, the importance of each video packet is computed by using position of the corresponding video frame in a group of pictures (GOP).

Various embodiments provide a cross-layer scheduling for video streaming in mixed traffic setup in which the importance level on the I packets may be lowered. In this embodiment, a virtual decoder estimates the position of the video frame in a GOP for the packet at the L3 layer, and then assigns an importance value to the frame (and the corresponding packets which contain the frame) to the MAC layer. For example, the information of the position may be inserted in the interne protocol (IP) header as a DiffServ information for simpler extraction. The position of the frame in GOP may be the easiest information to obtain. The length of this information may be 6 bits. The importance assignment may be based on the outcome of packetization. For example, the importance of the I packets may be allowed to be lower than the maximum importance level of the P packets. In the scheduling part, a U'R scheduling may be used and a sigmoid utility function that encompasses the packet importance and the delay of the video packets may be introduced. The content-aware downlink packet scheduling algorithm may be for video streaming under mixed classes of traffics. For VoIP traffic, different importance level and delay constraint may be used in the utility function. For non real-time traffic with rate constraint, the rate constraint may be converted into a delay constraint and the same utility function may be used. In a mixed traffic environment, the algorithm in accordance to various embodiments may estimate the importance of the video packets, and may assign a utility function for each packet, which may then be used by a gradient-based scheduling algorithm to allocate resources among users. For example, higher priority may be given to the real-time video and VoIP traffics, and lower priority to the non-real-time best-effort data traffics. For the video traffic, a content-aware downlink scheduler may take into account the video content information in the scheduling. The content-dependent information may be extracted by the virtual decoder in accordance to various embodiments, or passed to the scheduler in accordance to various embodiments from a higher layer. For example, a linearly decreasing priority may be assigned to the P frames in a GOP, while the priority (importance) of the I frame in the GOP may be assigned to be about 50% (this percentage being dependent on the simulation setup) of the highest P frame priority level. The non-real-time best-effort data traffic may then be scheduled based on the proportional fairness (PF) by using the remaining resources.

In various embodiments, a downlink packet scheduling algorithm for mixed classes of traffics may be provided. Similar utility functions may be used for real-time video and VoIP traffics, and non real-time traffic with rate constraint. Non real-time best-effort data traffic may have the lowest priority.

Various embodiments may provide video traffic scheduled by importance assignment and/or importance information derivation by for example, a virtual decoder, and the derived information being passed from a higher layer, or a core network, for example, the core network 104 of FIG. 1. A common utility function may be used for video, VoIP and non real-time (NRT) traffic with rate constraint.

Figure 2:
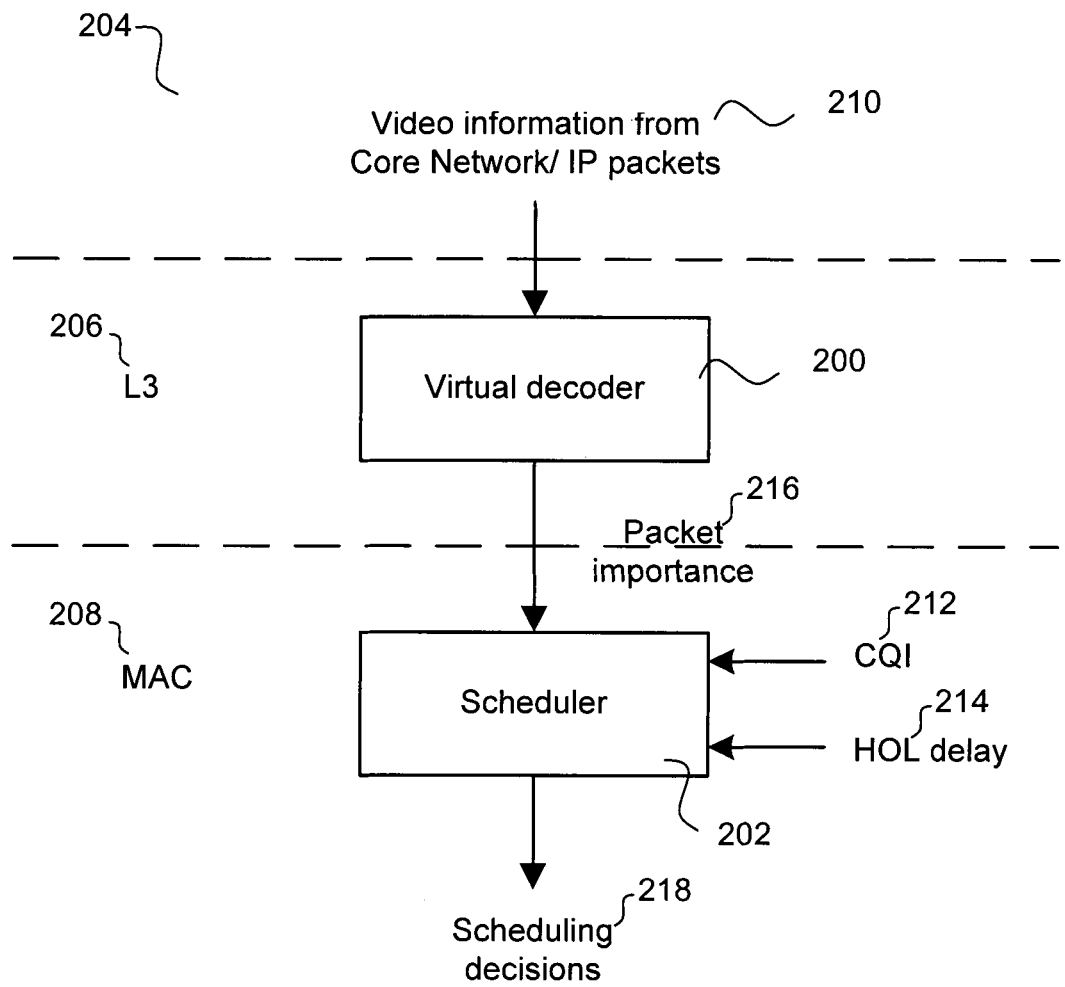
FIG. 2 shows a schematic block diagram of a virtual decoder and scheduler, in accordance to various embodiments.

FIG. 2 shows a block diagram for an exemplary virtual decoder and scheduler. In FIG. 2, both the virtual decoder 200 and scheduler 202 are implemented at the eNodeB 204. The virtual decoder 200 is placed in the L3 layer 206 while the scheduler 202 is placed in the MAC layer 208. The virtual decoder 200 takes the IP packets from Si or video information from core network 210 and generates their packet importance which is related to the video content. This video information at the application (APP) layer may help to improve the scheduling performance. The scheduler 202 takes in the channel quality indicators (CQI) 212, head of line (HOL) delays 214, and packet importance 216 of the users to make its scheduling decision 218, i.e., which user to transmit using what modulation and coding scheme on which resource block (RB). For example, the eNodeB 204 may be the eNodeB 106 of FIG. 1, the scheduler 202 may be the scheduler 108 of FIG. 1.

Figure 3:
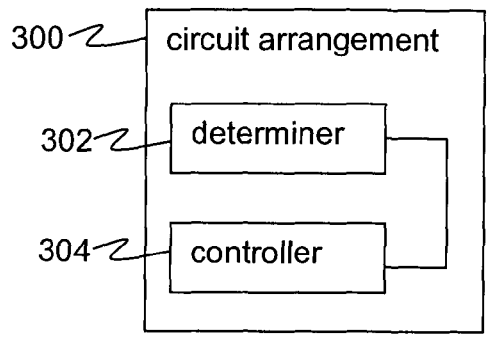
FIG. 3 shows a block diagram of a circuit arrangement, in accordance to various embodiments.

In a first aspect, a circuit arrangement for a wireless cellular network is provided as shown in FIG. 3. In FIG. 3, the circuit arrangement 300 includes a determiner 302 configured to determine a priority value of each packet of a plurality of packets based on at least a position of a video frame in a group of pictures (GOP) and a type of the video frame, wherein the determiner 302 is further configured to set the priority value of a packet including I frame data lower than the priority value of at least one other packet including P frame data; and a controller 304 configured to control scheduling of the packet based on the determined priority value for a communication device in a wireless cellular network. The video frame or a part thereof is contained in the packet and the type of video frame includes I frame data or P frame data.

In the context of various embodiments, the term "circuit arrangement" generally includes but is not limited to a packet scheduler for network bandwidth management that can monitor the importance of data packets and depending upon the priority of the packet, and give the packet higher or lower priority or bandwidth levels.

As used herein, the circuit arrangement 300 may include one or more circuits coupled to another one, wherein a "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java or e.g. digital signal processing algorithm. Any other kind of implementation of the respective functions which are described may also be understood as a "circuit" in accordance with an alternative aspect of this disclosure.

For example, the controller 304 may be the scheduler 108, 202 (FIG. 1, FIG. 2). In one embodiment, the controller 304 may be configured to perform downlink packet scheduling.

In one embodiment, the circuit arrangement 300 may be configured to operate for video streaming based on the 3GPP Long Term Evolution (LTE) interface protocol. For example, the circuit arrangement 300 may be based on a H.264 communication standard.

In various embodiments, the packet may be from a real-time video stream, or a voice-over-IP (VoIP) stream, or a non-real-time data with a rate constraint.

In various embodiments, the "type" of video frame may be referred to as a picture type or a frame type. The type of video frame may be an I frame (intra-coded picture frame) which is a frame that is the least compressible but do not require other video frames to decode; a P frame (predicted picture frame) which is a frame which can use data from previous frames to decompress and are more compressible than an I frame; and a B frame (bi-predictive picture frame) which is a frame which can use both previous and forward frames for data reference to get the highest amount of data compression.

An I frame is in effect a fully specified picture, like a conventional static image file. P frames and B frames hold only part of the image information, so they need less space to store than an I frame, and thus improve video compression rates.

A P frame holds only the changes in the image from the previous frame. For example, in a scene where a moving part moves across a stationary background, only the part's movements need to be encoded. The encoder does not need to store the unchanging background pixels in the P frame, thus saving space. P frames may also be known as delta frames.

A B frame saves even more space by using differences between the current frame and both the preceding and following frames to specify its content.

For example, the video frame may include a plurality of P frames or a plurality of I frames.

In the context of various embodiments, the term "I frame data" refers to at least one I frame or a part of an I frame or parts of at least one I frame. The term "P frame data" refers to at least one P frame or a part of an P frame or parts of at least one P frame. For example, a packet including I frame data may be but is not limited to a packet containing at least one I frame, a packet containing a part of an I frame, or a packet containing parts of at least one I frame. A packet including P frame data may be but is not limited to a packet containing at least one P frame, a packet containing a part of an P frame, or a packet containing parts of at least one P frame.

As used herein, the term "set" may refer but is not limited to "assign" or "allocate".

The term "priority value" refers to a numerical representation. For example, the priority value may be an integer or a natural number.

In the context of various embodiment, the term "communication device" refers to a machine that assists data transmission, that is sending and/or receiving data information. A communication device may be but is not limited to, for example, a mobile station (MS), or a port, or an access point, or a personal basic service set central point, or a mobile phone, or a cellular phone, etc.

In other examples, the communication device may be any of a Personal Digital Assistant (PDA), a Personal Communication Service (PCS) phone, a Mobile Broadband System (MBS) phone, etc. The communication device may interchangeably be referred to as the term 'User Equipment (UE)', 'Subscriber Station (SS)', 'Mobile Subscriber Station (MSS)', 'mobile terminal', 'Advanced Mobile Station (AMS)', etc.

In various embodiments, the communication device may include a user equipment (UE).

As used herein, the term "determine" may refer but is not limited to "compute", "verify", "check", "evaluate", "establish", or "assess".

In the context of various embodiments, the term "control, scheduling of the packet" is for determining which user to transmit using what modulation and coding scheme on which RB. For example, the "control scheduling of the packet" may be the scheduling decision 218 of FIG. 2.

In various embodiments, the determiner 302 may operate on a first layer of the wireless network or a part thereof, and the controller 304 may operate on a second layer of the wireless network or a part thereof, the first layer being different from the second layer.

In one embodiment, the first layer of the wireless network may include a Layer 3 (L3). The second layer of the wireless network may include a medium access control (MAC) layer.

For example, the L3 layer may be the L3 layer 206 of FIG. 2; the MAC layer may be the MAC layer 208 of FIG. 2; and the priority value may be related to or based on the packet importance 216 (FIG. 2).

In various embodiments, the determiner 302 may be configured to determine the priority value further based on a condition of a channel for packet transmission, and a delay value indicating an amount of delay for transmitting the packet. The condition of the channel may relate to a channel rate of the communication device. Example of the condition of the channel may refer but is not limited to channel capacity, or channel bandwidth, or noise susceptibility of the channel.

As used herein, the term "relate to" may mean "correspond to", or "have an effect on", or "depend on". For example, the channel rate may include a channel quality indicator (CQI). In various embodiments, the delay value may include a Head of Line (HOL) delay. A HOL delay is a queuing delay of a first (to be transmitted) packet in a queue.

For example, the CQI may be the CQI 212 and the HOL delay may be the HOL delay 214 (FIG. 2).

In an embodiment, the circuit arrangement 300 may be configured to compute a priority of scheduling by involving the packet importance (i.e., priority from the virtual decoder, for example, the virtual decoder 200 of FIG. 2), HOL delay and channel conditions. The virtual decoder may determine the I frames and/or P frames of the packet and set a "priority value" for the packet. For example, the determiner 302 may include the virtual decoder 200 or a part thereof. The virtual decoder may be configured to determine whether it is a I/P video packet, assign priority (packet importance) to the packet based on its position in GOP and set the priority of I packet (or I frame) lower than some of the P packets (P frames). A scheduler, for example, the scheduler 202 of FIG. 2, may use packet importance (from the virtual decoder 200), HOL delay and channel conditions to make scheduling decision for video traffic, handle non-real traffic with rate constraint by transforming the rate control into a delay constraint; thereby advantageously reducing the time-out on the TCP layer. For example, the determiner 302 may include the scheduler 202 or a part thereof. In another example, the controller 304 may include the scheduler 202 or a part thereof.

In various embodiments, upon determining the priority value of the packet, the controller 304 may further be configured to select a resource block and assign to the resource block the communication device which has the largest channel rate as compared to those of other communication devices in the wireless network. As used herein, the term "channel rate" means a rate at which a communication device communicates through a channel.

Various embodiments may provide in determining the priority value, the determiner 302 first determining an intermediate which may referred to as an importance value. The importance value may be computed or calculated using the position of the video frame, the type of the video frame or the combination thereof. For example, the importance value may be related to distortion. The importance value may be passed from the first layer of the wireless network to the second layer. In the second layer, the controller 304 or a part thereof takes other parameters of users and channels into consideration and along with the importance value, a mathematical function is formulated. These "other parameters" may include the channel rate of the communication device and the delay value. This mathematical function may be referred to as a utility function. The priority value may derived from the utility function.

In one embodiment, the priority value may have a relationship with the HOL delay based on a decreasing function. In other words, the utility function may be a decreasing function of the HOL delay.

In another embodiment, the priority value may have a relationship with the HOL delay based on a concave function. This means that the utility function may be a concave function of the HOL delay.

In yet another embodiment, the priority value may have a relationship with the HOL delay based on a convex function. This means that the utility function may be a convex function of the HOL delay.

In a different embodiment, the priority value may have a relationship with an overall distortion caused by a loss of packet ($D_k$) based an increasing function. This refers that the utility function may be an increasing function of an overall distortion caused by a loss of packet ($D_k$).

For example, a cross layer utility function of user k in accordance with various embodiments is a function of HOL delay $w_k$ and the overall distortion $D_k$ caused by the loss of packet. The cross layer utility function may be denoted as $U_k(w_k,D_k)$. The cross layer utility function may represent the level of satisfaction of a user who experiences packet transmission delay. If there is a deadline $W_k$ for the packets, the utility may drop abruptly beyond the deadline. $U_k(w_k, D_k)$ has the following features:

1. $U_k(w_k,D_k)$ is a decreasing function of $w_k$, i.e., $$\frac{\partial U_k}{\partial w_k} \leq 0.$$

2. $U_k(W_k,D_k)$ is a concave function of $w_k$ for $w_k \leq W_k$, i.e., $$\frac{\partial^2 U_k}{\partial w_k^2} \leq 0.$$

3. $U_k(W_k,D_k)$ is a increasing function of $D_k$, i.e., $$\frac{\partial U_k}{\partial D_k} \geq 0.$$

As described above, $U_k(w_k,D_k)$ is a concave function for $w_k \leq W_k$, therefore for $w_k > W_k$, $U_k(w_k,D_k)$ is a convex function.

Consider a class of $U_k(w_k,D_k)$ which is given as $$U_k(W_k,D_k) = \Phi(w_k)\Psi(D_k) \tag{1}$$

where $\Phi(w_k)$ and $\Psi(D_k)$ are two positive functions satisfying:

$$\Phi_k''(w_k) \leq 0, \text{ for } w_k \leq W_k; \text{ and } \Psi_k'(D_k) \geq 0.$$

In various embodiments, the priority value may be derived using a mathematical function which is selected based on a type of traffic scheduled for the packet. In an embodiment, the packet may be from a non-real-time data with a rate constraint, and the priority value may be derived using a mathematical function which converts the rate constraint to a delay constraint.

For example, the mathematical function may a sigmoidal-like function. In other words, the utility function may be a sigmoidal-like utility function.

As used herein, the term "rate constraint" generally refers to a restriction or a limitation cause by or related to the rate of data transfer, i.e., how fast or slow data is transferred. The term "delay constraint" generally means a restriction or a limitation caused by or related to a time delay in data transfer.

In the scheduling algorithm according to various embodiments, the sigmoidal-like utility function as a function of the normalize delay for each video packet $$\Phi_k(w_k) = \frac{1}{1+e^{b(w_k-W_k)/W_k}}, \text{ and} \tag{2}$$

$$\Psi(D_k) = a_k \tag{3}$$

It should be appreciated that with packet importance, it is not restricted to one utility function per user.

Figure 4:
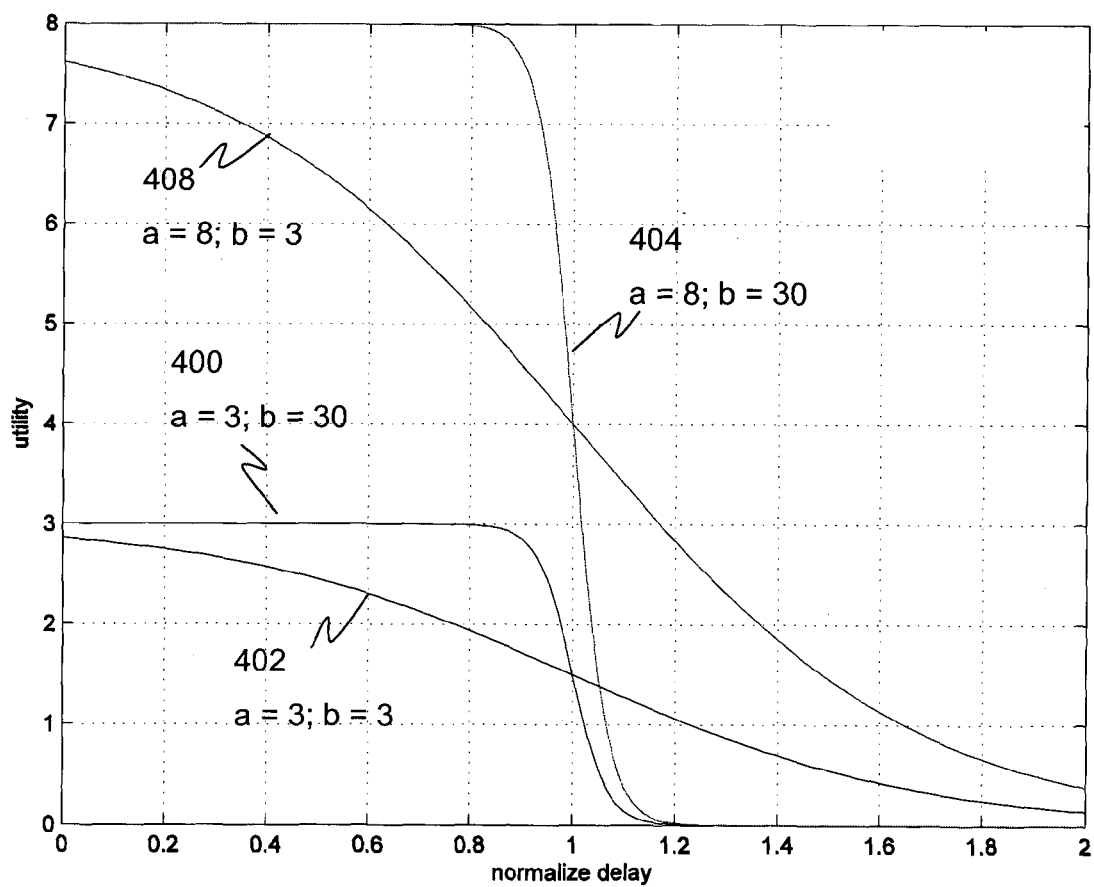
FIG. 4 shows exemplary sigmoidal-like utility functions for video streaming, in accordance to various embodiments.

Parameter $a_k$ and b determine the shape of the utility function, as shown in FIG. 4. $a_k$ manipulates a height of the utility function while b affects the drop of the utility function. The parameter $a_k$ is used to represent the packet importance estimated by the virtual decoder, for example, the virtual decoder 200 of FIG. 2. When $a_k=1$, each packet has the same importance. This is labelled as the U'R scheduler and it is similar to the urgency and efficiency based packet scheduling (UEPS) algorithm. However, the main purpose of UEPS is to delay the real time traffic transmission for the non-real time traffic transmission. The priority of UEPS is normalized by the average CQI and is not a cross-layer scheduler.

With video information, $a_k$ may approximate the value of packet importance when the packet is received within the deadline. This importance is related to the contribution to distortion. For example, the type and position information of the video frame in a GOP may be used to determine the packet importance (e.g., the packet importance 216 of FIG. 2).

Figure 5:
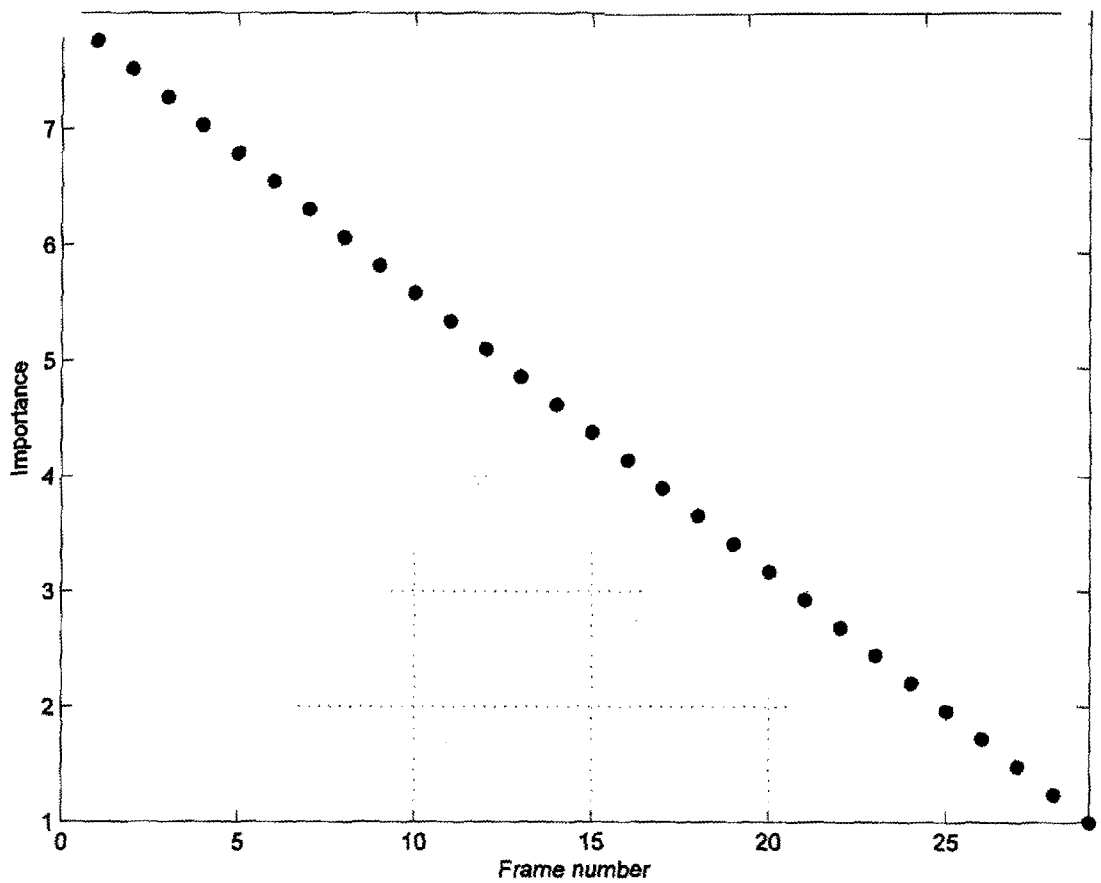
FIG. 5 shows an example of frame importance of video sequence, in accordance to various embodiments.

FIG. 5 shows one frame importance assignment to each frame of the video with GOP=30. Frame 0 is the I frame and Frame 1 to 29 are the P frames. All packets within the same frame have the same importance. Importance is linearly decreasing. A lost I frame leads to a higher distortion. Intuitively, the highest importance level should be assigned to I packets. In FIG. 5, I frame has the highest importance (i.e. at importance level=8).

Due to packetization for wireless transmission, each I frame is packetized to a lot more I packets. Hence, each I packet only contributes to only a small area of the frame. It has been observed that the loss of an I packet has a smaller area impact and hence, a smaller performance loss than the loss of a P packet. Hence, a lower importance may be assigned to the I packets than that of the earlier P packets in the GOP.

Figure 6:
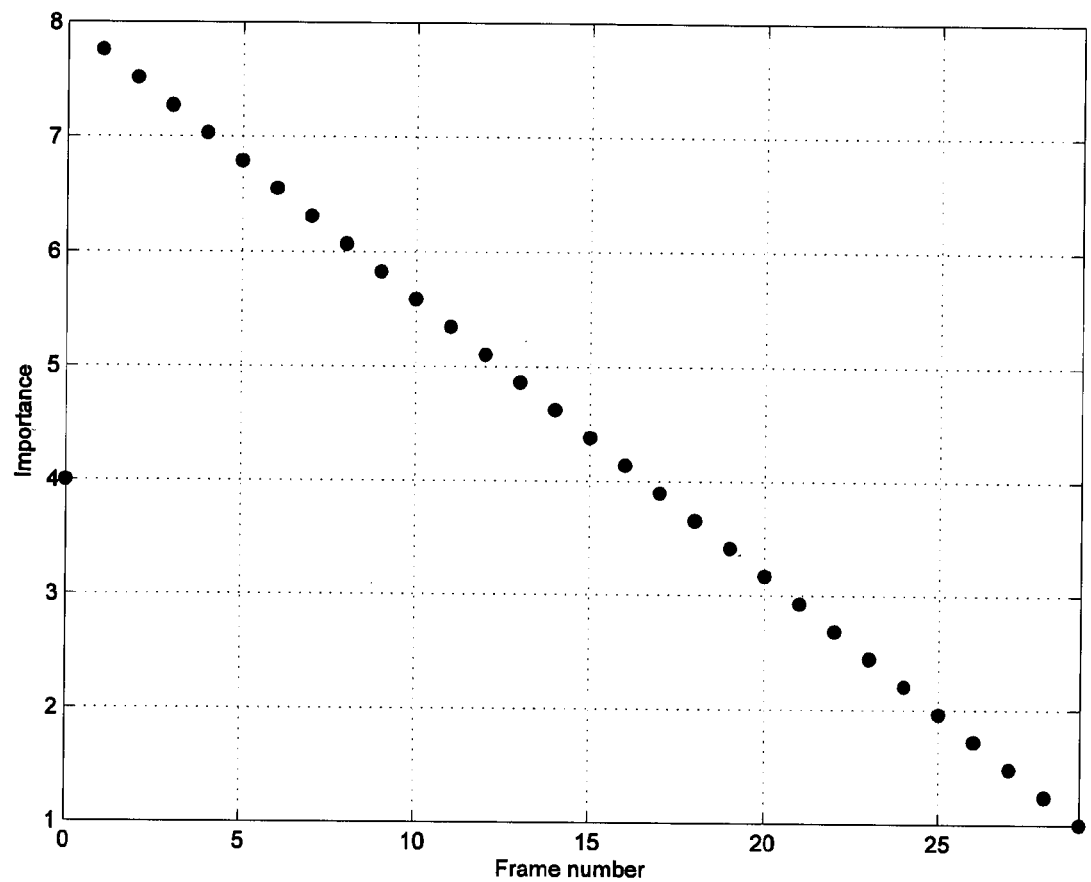
FIG. 6 shows another example illustrating modified frame importance of the video sequence, in accordance to various embodiments.

FIG. 6 shows an alternative assignment of the importance levels. Now, the highest importance level is 8 and is linearly decreasing with the frame number. It should be noted that the highest importance level is a parameter for tuning. Value of 8 to 16 generally works well with the numerical examples based on various embodiments of the invention. In FIG. 6, the importance of the I packets are reduced to 4 (frame 0), i.e., half of the maximum or highest importance level.

In one embodiment, the GOP may include a P frame and an I frame and the circuit arrangement 300 may assign the importance value of the I frame to be about 50% of the highest P frame importance level. More specifically, the determiner 302 may be configured to set the priority value of the packet including the I frame data, the priority value indicating to be about 50% of the highest priority value of the packet including the P frame data. In other examples, the priority value including the I frame data may be set to about 30%, about 40%, about 60% or about 70% of the highest priority value of the packet including the P frame data. It should be appreciated that the percentage value may be of any value for a tuning parameter.

The parameter b determines the abruptness in the drop of utility with respect to the delay. Due to channel error, the utility cannot be allowed to drop too abruptly as it may push the packet transmission to start only towards its deadline and leave no time for retransmission. Simulation examples show that b=6 has the best performance.

The utility-based scheduling algorithm in accordance to various embodiments aims to maximize total utility. As an illustrative example, a simple case is considered that there are two users with one packet each to transmit. Looking two time slots ahead, and assuming the channel for each user stays fixed across the two time slots, the utility derived by transmitting in the order of 1 and 2 is $$\Phi_1(w_1+L/c_1)\Psi_1(D_1)+\Phi_2(w_2+L/c_1+L/c_2)\Psi_2(D_2) \quad (4)$$

where L, $c_1$, and $c_2$ are packet size, channel rates of users 1 and 2, respectively.

Transmitting the reverse order gives the following total utility function $$\Phi_2(w_2+L/c_2)\Psi_2(D_2)+\Phi_1(w_1+L/c_2+L/c_1)\Psi_1(D_1) \quad (5)$$

By using the first order Taylor expansion, an approximated condition for (4)≥(5) is $$|\Phi_1'(w_1)|\Psi_1(D_1)c_1 \geq |\Phi_2'(w_2)|\Psi_2(D_2)c_2 \quad (6)$$

Therefore, a gradient-based scheduling algorithm (U'R) is proposed which selects a user k* whose rate multiplied by the utility derivative is the largest $$k^* = \underset{k}{\mathrm{argmax}}\{|\Phi'(w_k)|\Psi_k(D_k)c_{k,n}(t)\}, \quad (7)$$

where $c_{k,n}(t)$ is the instantaneous channel rate or (CQI) at TTI t for RB n.

It may be derived that $$\Phi'(w_k) = -\frac{be^{b(w_k-W_k)/W_k}}{W(1+e^{b(w_k-W_k)/W_k})^2} \quad \text{and} \quad (8)$$

$$\frac{d|\Phi'(w_k)|}{dw_k} = \frac{b^2 e^{b(w_k-W_k)/W_k}(1-e^{b(w_k-W_k)/W_k})}{W^2(1+e^{b(w_k-W_k)/W_k})^3} \quad (9)$$

It follows that $$\frac{d|\Phi'(w_k)|}{dw_k} \geq 0$$

when $w_k \leq W_k$. This implies that a packet which approaches its maximal delay bound is assigned a higher priority by the scheduling algorithm in accordance to various embodiments. To summarize, a flowchart depicting the synchronization algorithm in accordance to various embodiments is shown in FIG. 7.

Figure 7:
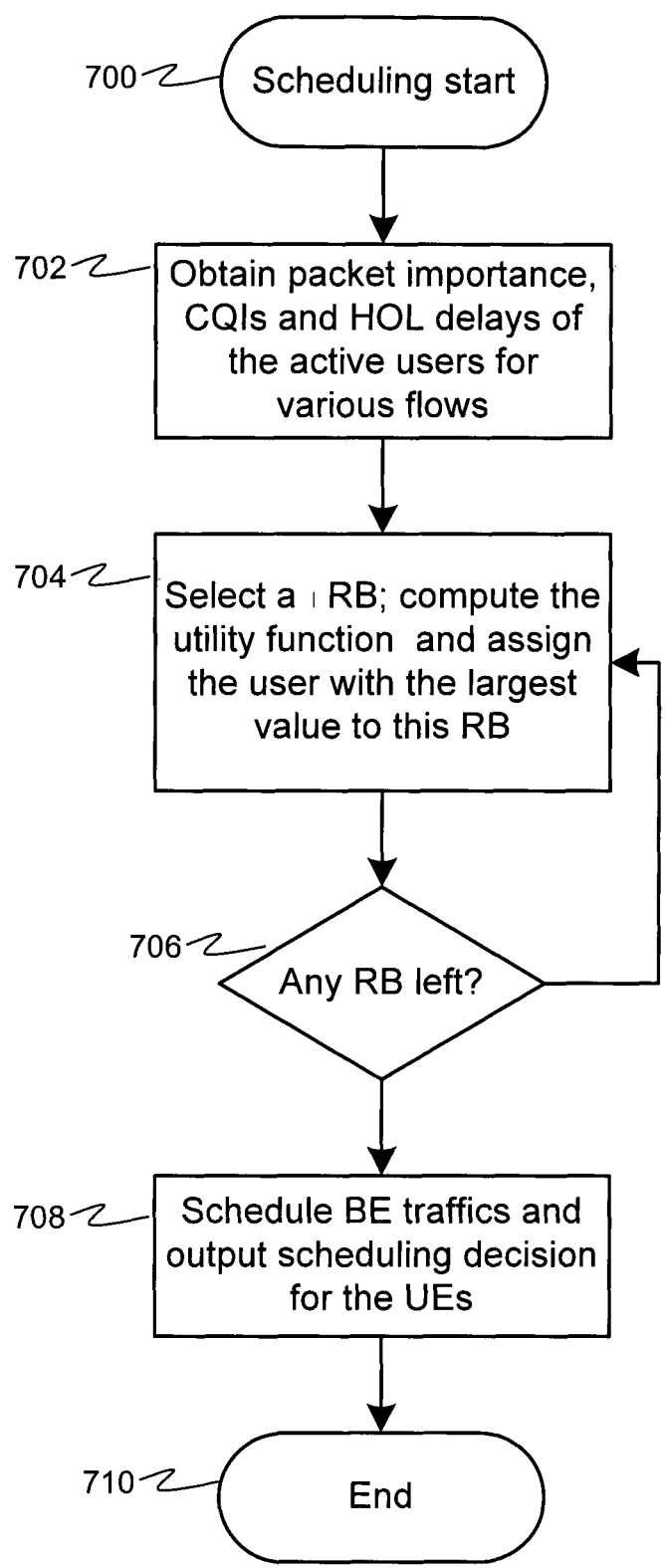
FIG. 7 shows a flow diagram of a scheduling algorithm, in accordance to various embodiments.

In FIG. 7, at 700, the scheduling algorithm starts and follows by obtaining packet importance, CQIs and HOL delays of the active users for various traffic flows at 702. At 704, the scheduling algorithms selects a resource block, computes the utility function and assigns the user with the largest value to this resource block. At 706, the algorithm checks whether any resource blocks are left. If no, step 704 is repeated. If yes, the algorithm then schedules best effort (BE) traffics and outputs scheduling decision for the UEs at 708. The scheduling algorithm ends at 710.

For VoIP, the delay constraint, $a_k$ and b in Equation (2) are set according to its requirement. For NRT traffic with rate constraint, the rate constraint is first converted to a delay constraint. Then it employs the same utility function given in Equation (2) with suitable $a_k$ and b. Since BE flow does not have any constraint, it is given the lowest scheduling. That is, it would be scheduled after all other traffic flows.

In some embodiments, the controller 304 may further be configured to output a BE traffic. A best effort traffic may refer to a non-detrimental traffic which an Internet Service Provider would consider insensitive to QoS parameters such as jitter, packet loss, and/or latency. For example, a best traffic may be but is not limited to a peer-to-peer application and an email application.

In various embodiments, the determiner 302 may further include a decoder configured to extract and decode header information of the packet.

As used herein, the term "decoder" generally refers to a device which performs the reverse operation of an encoder by undoing the encoding so that the original information can be retrieved. The decoder, for example, the virtual decoder 200 of FIG. 2 may further correct errors present in the information to be decoded. For example, such errors may be introduced by a noisy environment (e.g. a noisy or degrading transmission channel) or may be due to loss of information.

For example, the header information may include a sequence parameter set (SPS) header, a picture parameter set (PPS) header, or both. The SPS header is the header in a sequence parameter set, which applies to a series of consecutive coded video pictures called a coded video sequence. The PPS header is the header in a picture parameter set, which applies to the decoding of one or more individual pictures within a coded video sequence.

A "parameter set" contains information that is expected to rarely change and offers the decoding to a large number of video data packets. For example, the video data packets may be Video Coding Layer (VCL) network abstraction layer (NAL) units of a H.264 video sequence.

The H.264 encoded video sequence is made up of a series of NAL units. NAL units can be further sub-divided into two categories; Video Coding Layer (VCL) NAL units and non-VCL NAL units. VCL NAL units basically contain the coded video data. Therefore, SPS and PPS headers are considered as non-VCL NAL units.

In some embodiments, the decoder may be configured to determine the position of the video frame in the group of pictures (GOP) for the packet.

Video distortion analysis plays an important role in a cross layer scheduling algorithm in accordance to various embodiments, and it has three features:
1. a low complexity method is preferred to alleviate computation burden;
2. the distortion propagation of the subsequent frames caused by the current frame must be taken into consideration;
3. it is sufficient to estimate relative importance of each packet rather than its real one.

Even though several methods on computation of distortion-only utility function $\Psi_k(D_k)$ are in the current state of the art, they are too complex to implement. A simple method which is based on the position and type of a frame in a GOP to estimate the priority of corresponding video packet is introduced and the implementation of the scheme is described below.

In calculation of frame priority, for the packet whose loss at the receiving end results in serious distortion, high priority may be assigned. Due to the motion prediction scheme used in video coding standards, the frames have different influence on video quality according to their types and indices. The first frame in a GOP, which is an I frame, is the most important frame within the GOP. If I frame is lost, then all following inter frames become useless, even though they are correctly received. B frames are the least important frames, as their loss should not affect the decoding of other frames. Error concealment scheme may easily interpolate B frames by using temporally adjacent frames. The importance of a P frame is decided by its index within GOP. The P frame at anterior part of GOP is more important than the P frame at posterior part, because the decoding of posterior P frames is dependent on the correctly decoded anterior P frames. To achieve better video quality at the receiver side, the scheduling algorithm in accordance to various embodiments is adaptive to the frame property. The transmission of I frame and anterior P frames have higher priority than the other frames. And the packets, which encapsulate B frames, may be dropped when bandwidth is not enough.

As an illustrative example, a simple priority calculation scheme to estimate the importance of each frame within a GOP according to their indexes and types is described. The notations in the scheme are defined as follows:

$\overline{N}_{gop}$: the average size of coded GOPs;
$N_{gop}$: the size of the previous GOP;
$\overline{N}_B$: the average number of B frames between two consecutive P frames or between a pair of I and P frames;
$N_B$: the number of B frames between the previous two consecutive P frames or between the previous I and P frames;
$N_p$: the total number of P frames in a GOP;
$N_{p,c}$: the position of the current P frame;
$N_{B,c}$: the position of the current B frame;
m: the total number of priorities. The value of is decided by a scheduler at MAC/PHY layer; and
$L_{B,c}$: the level of the current B frame.

Three cases are addressed as below.

Case 1. If the current frame is an INTRA frame, the value of $\Psi_k(D_k)$ is m.

Case 2. If the current frame is a unidirectional INTER (or P) frame, the value of $\Psi_k(D_k)$ is computed via the following steps:

Step 1: Compute the values of $N_p$ and $N_{p,c}$ according to the information from a virtual decoder. Note that all B frames are removed from the current GOP when the value of $N_{p,c}$ is computed.

Their values are $$\overline{N}_{gop} = \left(1 - \frac{1}{2^n}\right)\overline{N}_{gop} + \frac{1}{2^n}N_{gop} \qquad (10)$$

$$N_p = \frac{N_{gop} - 1}{N_B + 1}; \qquad (11)$$

$$N_{p,c} = \frac{POC}{2(N_B + 1)}. \qquad (12)$$

POC is the position of the current frame in the video sequence. It is impossible to compute the value of $N_p$ for the first GOP. Its initial value is set as 64 which is based on the assumption that the value of $N_B$ is 0. GOP size is often set as 30 or 60 frames according to application. The initial GOP size is larger than the actual GOP size in most cases. Then frame priority may not be degraded due to inaccurate GOP size. Its value may be updated as $$2^{\lfloor \log_2\left(\frac{64}{N_B+1}\right)+0.5 \rfloor}$$

after the value of $N_B$ is available. Here, $\lfloor x \rfloor$ is the largest integer that is less than x. The value of $\overline{N}_{gop}$ is set as the size of the first GOP after the first GOP is coded.

Step 2: Compute the priority of the current P frame as follows:

$$\Psi_k(D_k) = \qquad (13)$$
$$\max\left\{m - 1 - \left\lfloor \frac{\min\{m - 2, N_p + \lfloor \log_2(N_B + 1) \rfloor - 1\}}{N_p + \lfloor \log_2(N_B + 1) \rfloor - 1} * (N_{p,c} - 1) \right\rfloor, 1 + \Delta\right\}$$

where the value of $\Delta$ is $$\Delta = m - 2 - \left\lfloor \frac{\min\{m - 2, N_p + \lfloor \log_2(\overline{N}_B + 1) \rfloor - 1\}}{N_p + \lfloor \log_2(\overline{N}_B + 1) \rfloor - 1}(N_p - 1) \right\rfloor \qquad (14)$$

The initial value of $\overline{N}_B$ is set as 0 and it may be updated if the actual value of $\overline{N}_B$ is identified as a positive value after decoding a given of number of frames.

Case 3. If the current frame is bidirectional INTER (or B) frame, the value of $\Psi_k(D_k)$ is computed as below. The highest priority of B frames is set as $\Delta$ if there are B frames. It should be appreciated that the case of hierarchical B frames is also addressed. The number on the positions of frames in a GOP starts from 1. The priority of the current B frame is computed as follows:

$$\overline{N}_B = \left(1 - \frac{1}{2^n}\right)\overline{N}_B + \frac{1}{2^n}N_B; \qquad (15)$$

$$L_{B,c} = 1; \qquad (16)$$

-continued $$N_{B,c} = N_{B,c} - 1; \quad (17)$$

$$\text{if } (N_{B,c} \bmod 2 == 0)\{$$

$$N_{B,c} = \frac{N_{B,c}}{2};$$

$$L_{B,c} = L_{B,c} + 1;\} \quad (18)$$

$$L_{B,c} = \lfloor \log_2(\overline{N}_B + 1) \rfloor - L_{B,c} \quad (19)$$

$$\Psi_k(D_k) = \Delta - \left\lfloor \frac{\min\{\Delta - 1, \lfloor \log_2(\overline{N}_B + 1) \rfloor - 1\}}{\lfloor \log_2(\overline{N}_B + 1) \rfloor - 1} L_{B,c} \right\rfloor, \quad (20)$$

$$\Psi_k(D_k) = \max\{\Psi_k(D_k), 1\}. \quad (21)$$

For P frame, $\Psi_k$ indicates the importance level of corresponding frame packets. For Intra frame, importance level of a packet is refined as $\kappa \Psi_k$, where $0 < \kappa \le 1$. This setting is based on the observation that the size of encoded I frame is much larger than P frame. A P frame may be transmitted in one or two packets, but an I frame is often divided into 10 or more packets for transmission. One packet of I frame only contains a small portion of whole frame, and a packet of P frame may include the entire frame information. Thus moderately decreasing the importance level of I frame packets, except the first I frame, may achieve better balance between the protections of I frame, and P frames.

The aim of the scheme in accordance to various embodiment is to minimize the video distortion in receiver side. By the scheme, the frames whose losses result in high distortion have high priority in transmission. And the frame with low priority may be dropped when bandwidth is not enough. The overall video quality in receiver side may be improved by the scheme.

The priority calculation of video packet is implemented by a virtual decoder which extracts the information such as frame index and type from video packet and computes the priority accordingly. For example, the virtual decoder may be the virtual decoder 200 of FIG. 2. Next, the virtual decoder implementation based on H.264 standard is described. It should be understood that the principle, however, may apply to other video coding standards too.

The virtual decoder may be placed in L3 of eNodeB, for example, as shown in FIG. 2.

Figure 8:
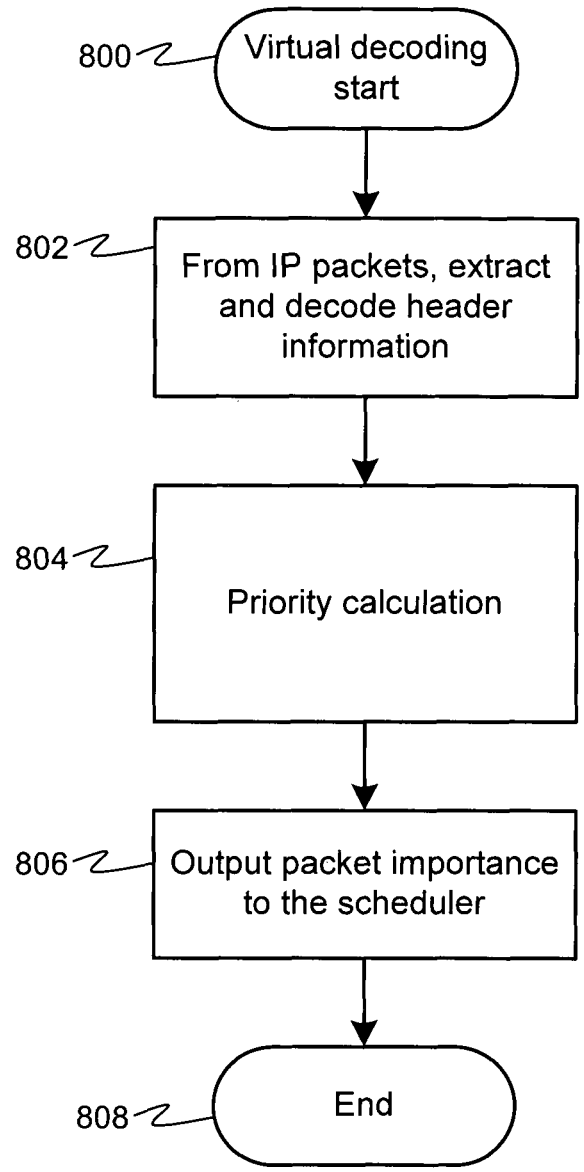
FIG. 8 shows a flow diagram of a virtual decoding algorithm, in accordance to various embodiments.

The flowchart of the virtual decoder is presented in FIG. 8. At 800, the virtual decoding starts. The decoding is divided into two main parts, one part for the extraction and decoding of header information from IP packets which contain the H.264 bitstream at 802, and the other part for the priority calculation 804.

The virtual decoder first determines the type of frame in the packet and then assigns a priority value for each frame in the video flow by using the scheme in accordance to various embodiments in last subsection. The input to the virtual decoder is packets of H.264 bitstream, and the output from the virtual decoder is indicator of frame priority for each input packet at 806. The output priority is used as input parameter for the cross layer scheduling algorithm in accordance to various embodiments. The decoding ends at 808.

To determine the type of frame, the virtual decoder needs to extract and decodes the information of Slice Header (SH), as a frame's type and index are indicated by SH. The syntax related to priority calculation includes slice_type, frame_num and pic_order_cnt_lsb. Due to the variable length coding (VLC), the syntax before and between these related syntax must also be decoded. The corresponding SPS must be extracted and decoded, as the decoding of 'frame_num', 'field_pic_flag' and 'pic_order_cnt_lsb' are dependent on the SPS. The ID of corresponding SPS is indicated by the PPS. In other words, to extract the related information for priority calculation, the corresponding SPS and PPS may be found and partially decoded. Compared to a real H.264 decoder, the computational cost, especially the memory requirement, of the visual decoder is negligible. So it is suitable for server implementation.

Figure 9:
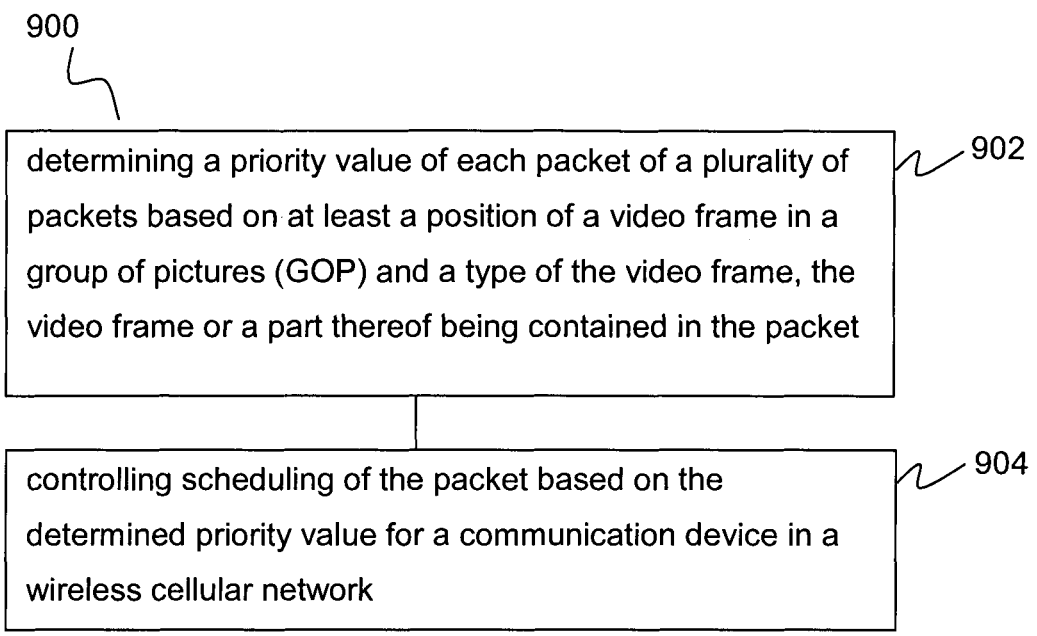
FIG. 9 shows a flow diagram of a method of packet scheduling, in accordance to various embodiments.
Figure 10:
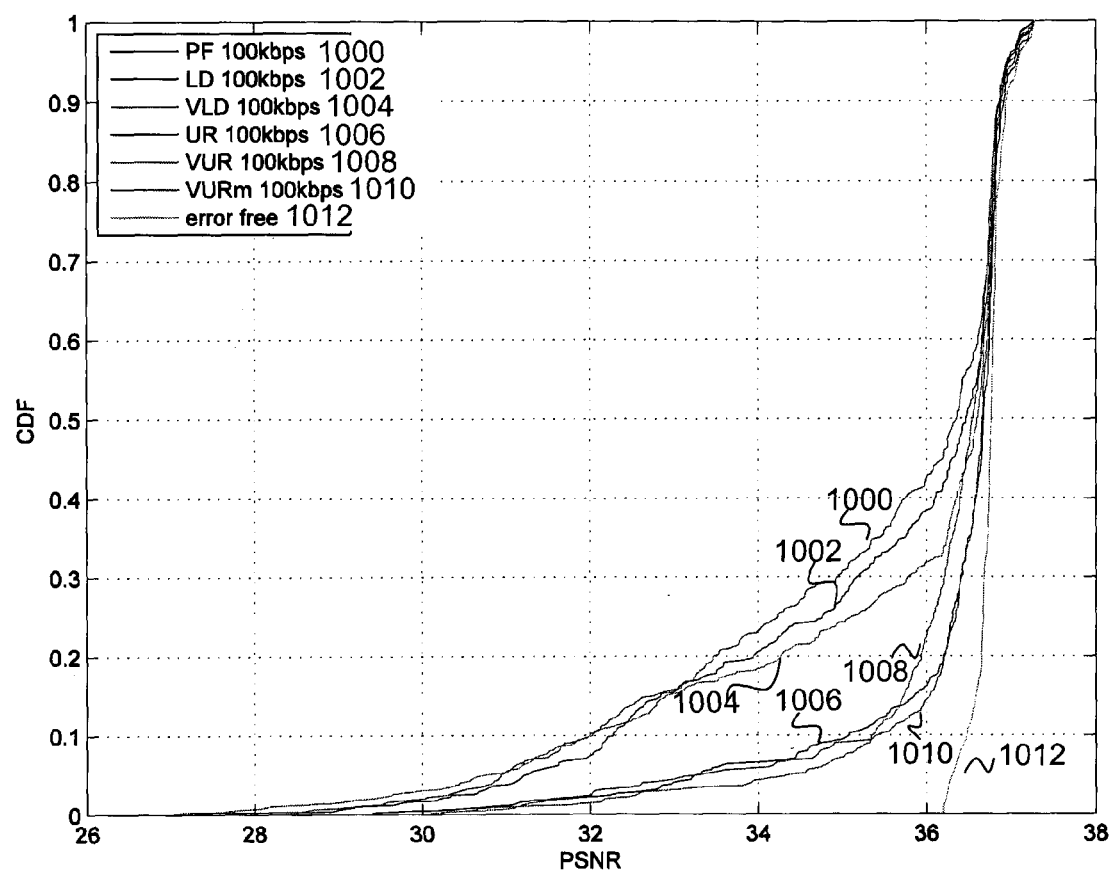
FIG. 10 shows empirical cumulative density functions (CDFs) of peak signal-to-noise ratio (PSNR) for Motherdaughter: 100 kbps with GOP=30 [PF 100 kbps (1000); LD 100 kbps (1002); VLD 100 kbps (1004); UR 100 kbps (1006); VUR 100 kbps (1008); VURm 100 kbps (1010); error free (1012)]
Figure 11:
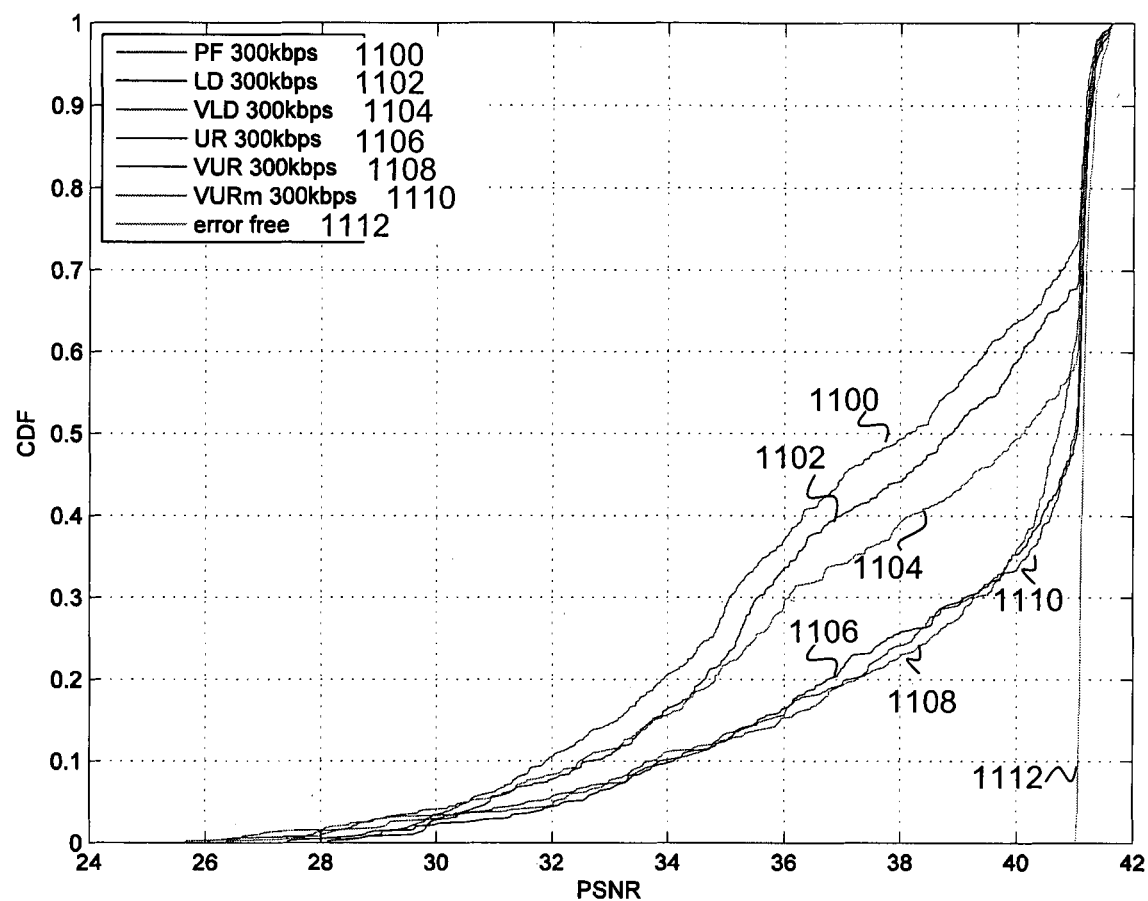
FIG. 11 shows empirical CDFs of PSNR for Motherdaughter: 300 kbps with GOP=30 [PF 300 kbps (1100); LD 300 kbps (1102); VLD 300 kbps (1104); UR 300 kbps (1106); VUR 300 kbps (1108); VURm 300 kbps (1110); error free (1112)]
Figure 12:
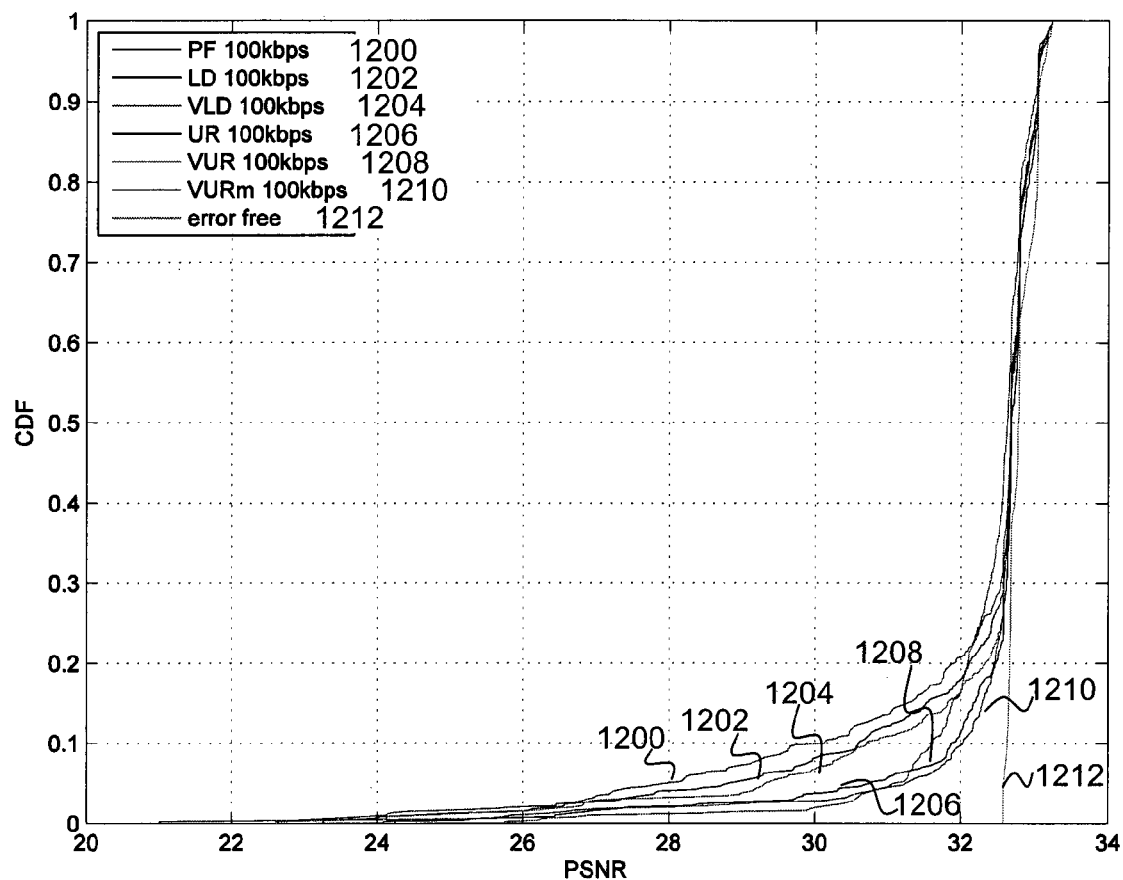
FIG. 12 shows empirical CDFs of PSNR for News: 100 kbps with GOP=30 [PF 100 kbps (1200); LD 100 kbps (1202); VLD 100 kbps (1204); UR 100 kbps (1206); VUR 100 kbps (1208); VURm 100 kbps (1210); error free (1212)]
Figure 13:
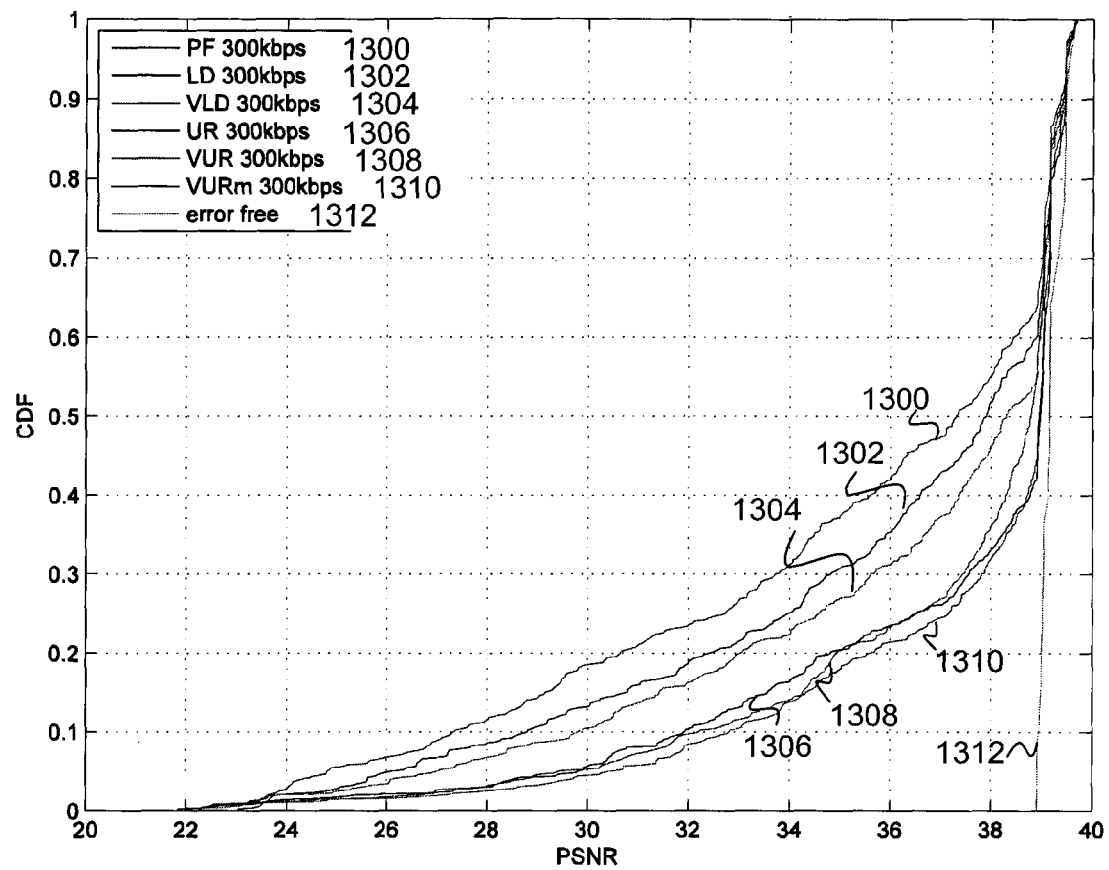
FIG. 13 shows empirical CDFs of PSNR for News: 300 kbps with GOP=30 [PF 300 kbps (1300); LD 300 kbps (1302); VLD 300 kbps (1304); UR 300 kbps (1306); VUR 300 kbps (1308); VURm 300 kbps (1310); error free (1312)]
Figure 14:
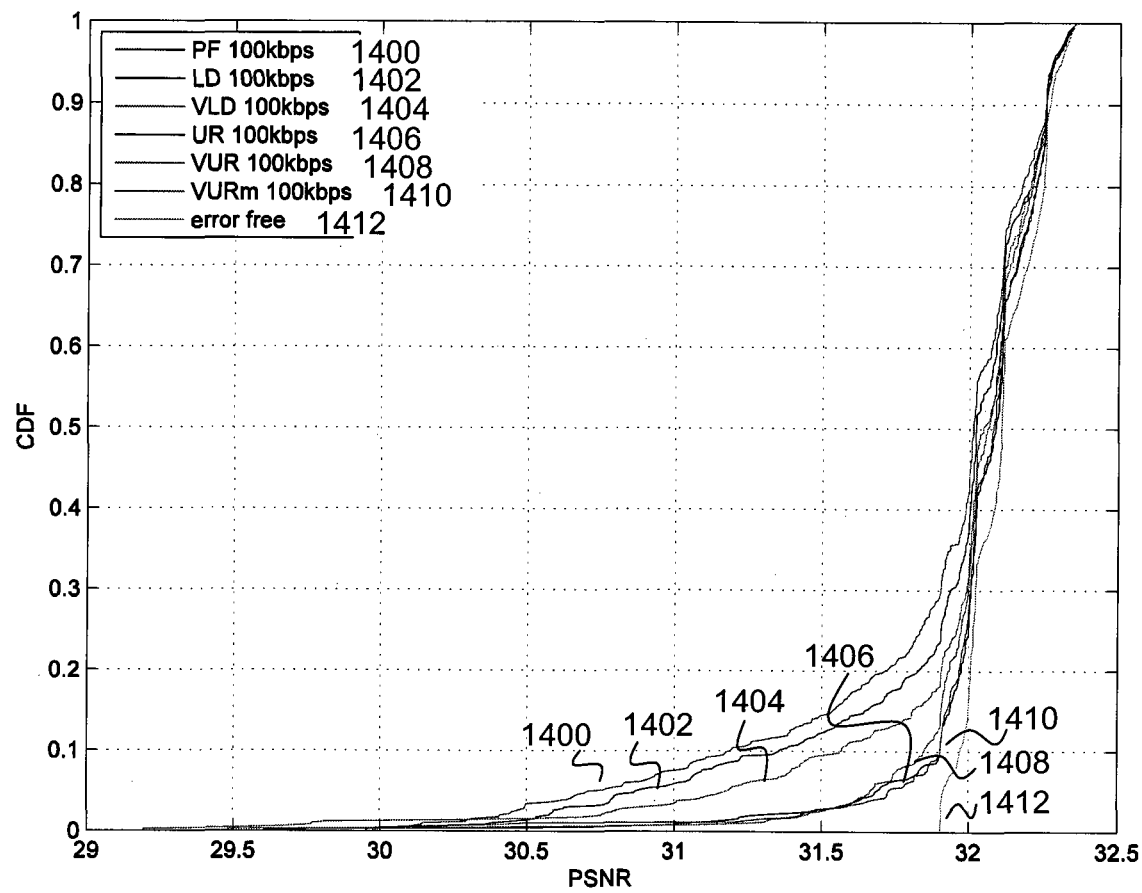
FIG. 14 shows empirical CDFs of PSNR for Container: 100 kbps with GOP=30 [PF 100 kbps (1400); LD 100 kbps (1402); VLD 100 kbps (1404); UR 100 kbps (1406); VUR 100 kbps (1408); VURm 100 kbps (1410); error free (1412)]
Figure 15:
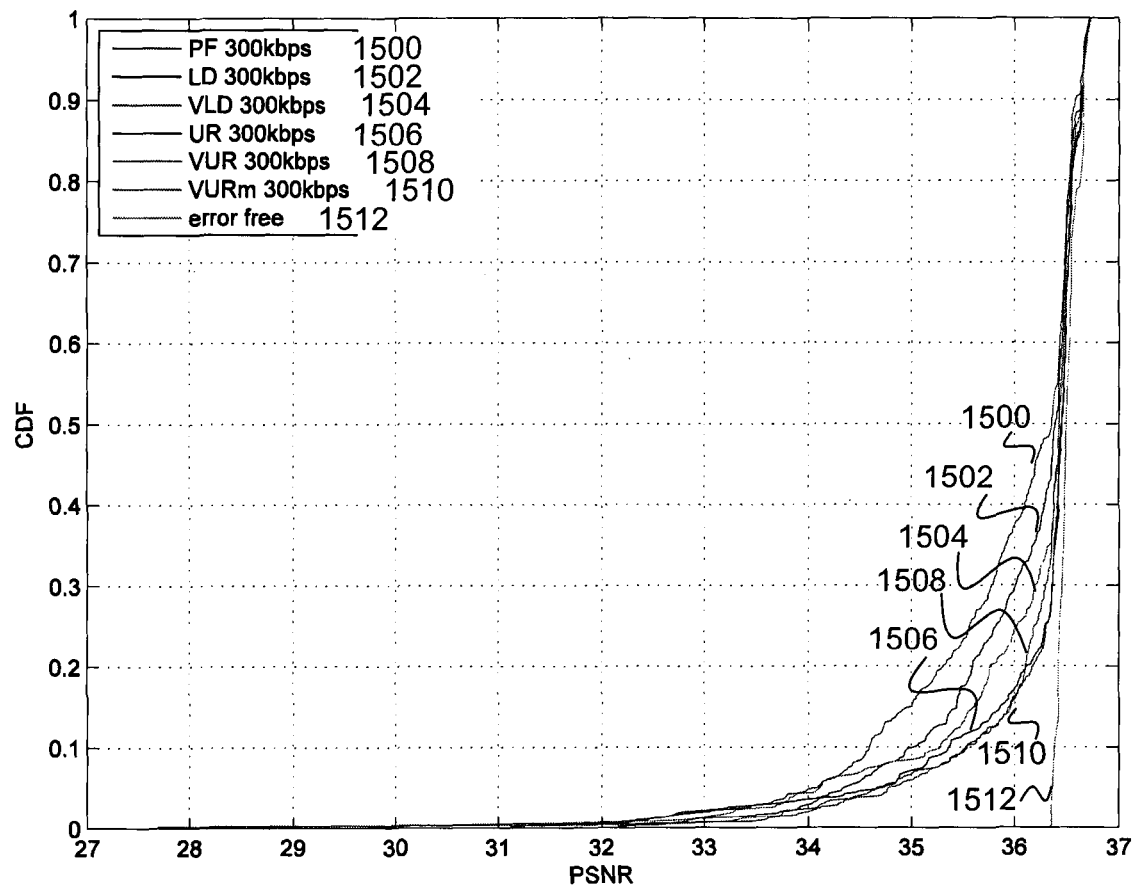
FIG. 15 shows empirical CDFs of PSNR for Container: 300 kbps with GOP=30 [PF 300 kbps (1500); LD 300 kbps (1502); VLD 300 kbps (1504); UR 300 kbps (1506); VUR 300 kbps (1508); VURm 300 kbps (1510); error free (1512)]
Figure 16:
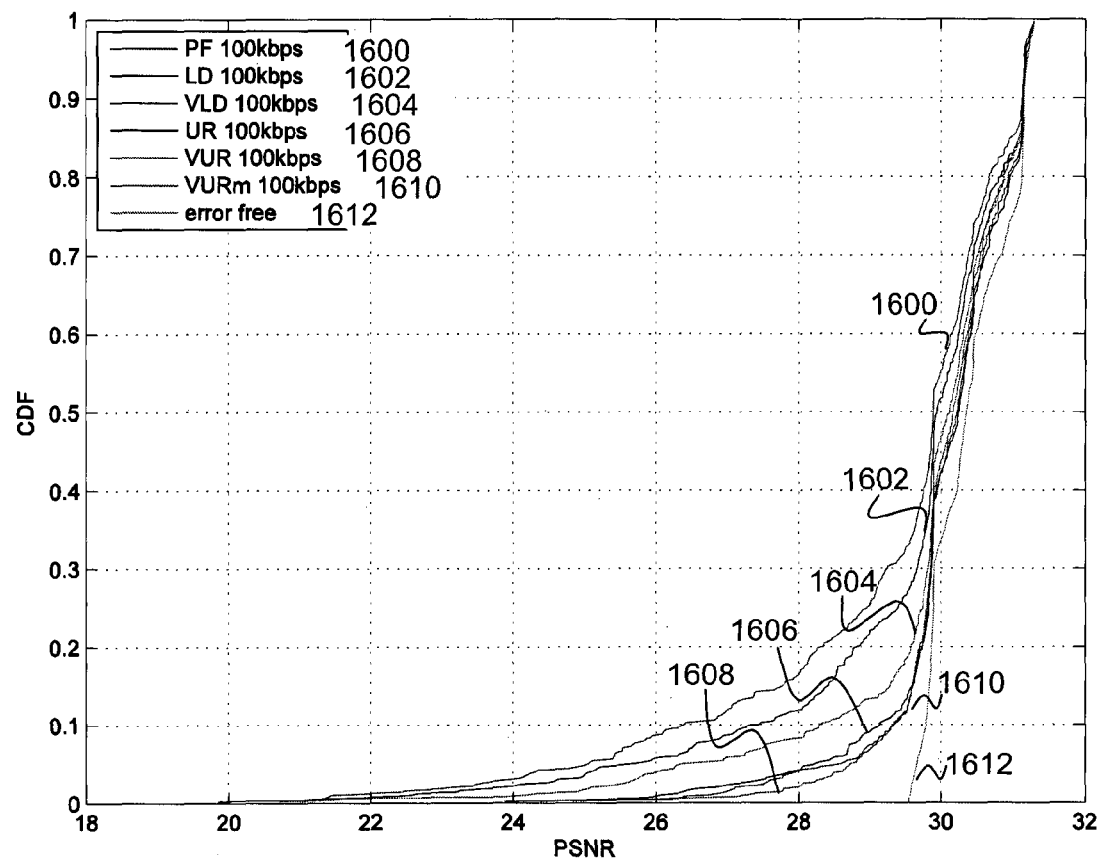
FIG. 16 shows empirical CDFs of PSNR for Foreman: 100 kbps with GOP=30 [PF 100 kbps (1600); LD 100 kbps (1602); VLD 100 kbps (1604); UR 100 kbps (1606); VUR 100 kbps (1608); VURm 100 kbps (1610); error free (1612)]
Figure 17:
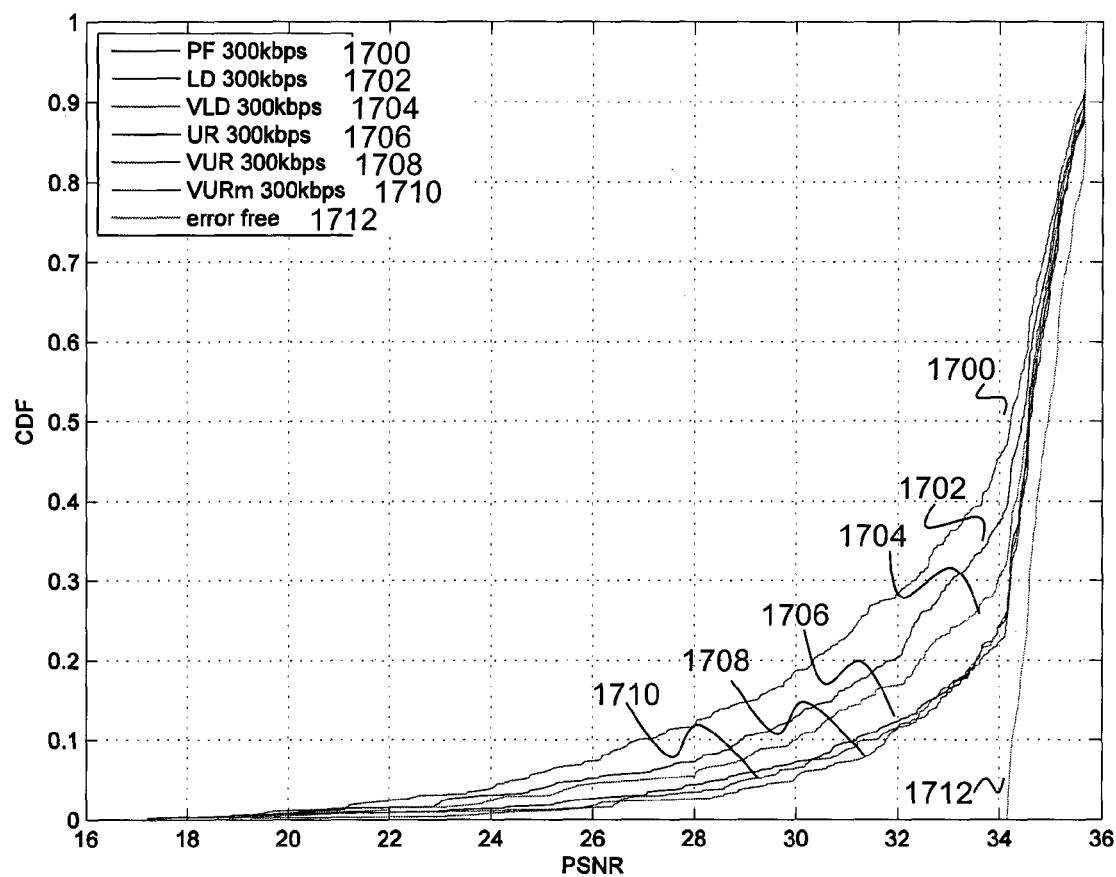
FIG. 17 shows empirical CDFs of PSNR for Foreman: 300 kbps with GOP=30 [PF 300 kbps (1700); LD 300 kbps (1702); VLD 300 kbps (1704); UR 300 kbps (1706); VUR 300 kbps (1708); VURm 300 kbps (1710); error free (1712)]
Figure 18:
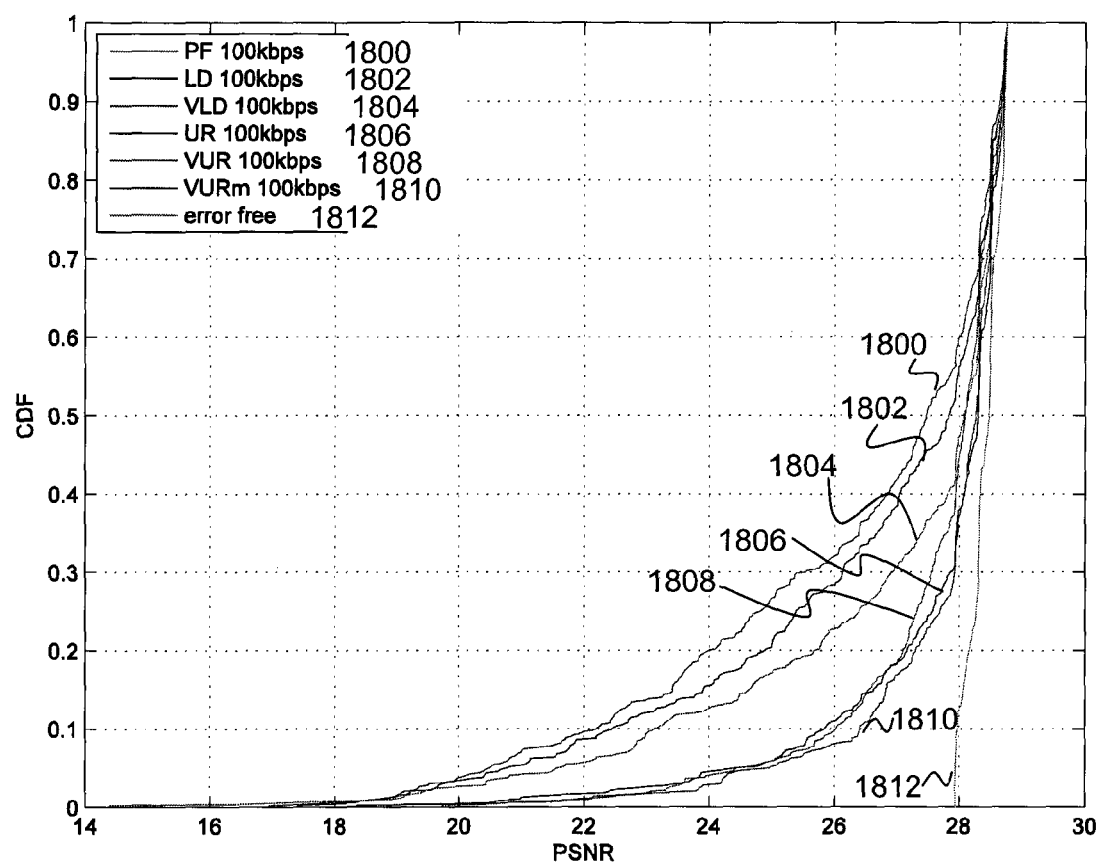
FIG. 18 shows empirical CDFs of PSNR for Soccer: 100 kbps with GOP=30 [PF 100 kbps (1800); LD 100 kbps (1802); VLD 100 kbps (1804); UR 100 kbps (1806); VUR 100 kbps (1808); VURm 100 kbps (1810); error free (1812)]
Figure 19:
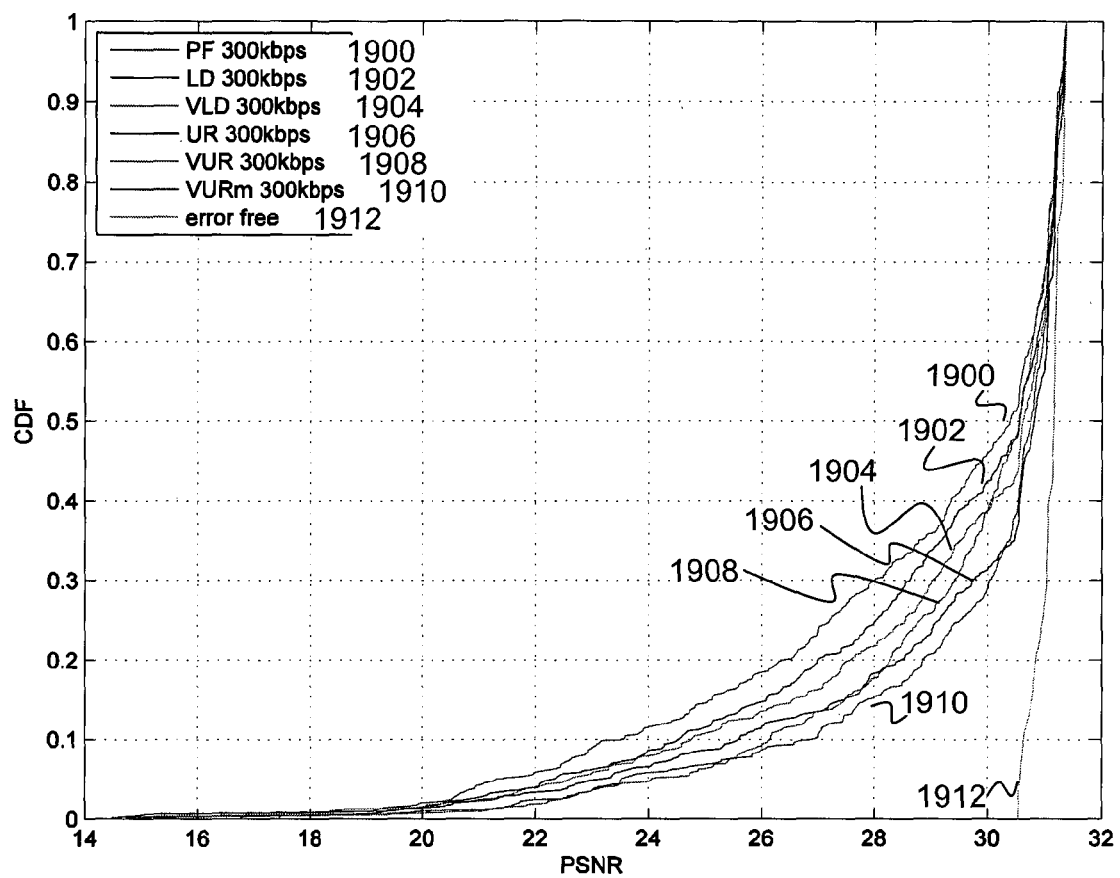
FIG. 19 shows empirical CDFs of PSNR for Soccer: 300 kbps with GOP=30 [PF 300 kbps (1900); LD 300 kbps (1902); VLD 300 kbps (1904); UR 300 kbps (1906); VUR 300 kbps (1908); VURm 300 kbps (1910); error free (1912)].

In a second aspect, a method 900 of determining a priority of packet scheduling in a wireless cellular network is provided as shown in FIG. 9. In FIG. 9, at 902, a priority value of each packet of a plurality of packets is determined based on at least a position of a video frame in a group of pictures (GOP) and a type of the video frame, the video frame or a part thereof being contained in the packet and the type of video frame includings I frame data or P frame data. Determining the priority value 902 further includes setting the priority value of a packet including I frame data lower than the priority value of at least one other packet including P frame data. At 904, scheduling of the packet is controlled based on the determined priority value for a communication device in a wireless cellular network.

In various embodiments, determining the priority value 902 includes determining the priority value on a first layer of the wireless network, and controlling scheduling of the packet 904 may include controlling scheduling of the packet on a second layer, the first layer being different from the second layer. The first layer and the second layer are as defined above.

In various embodiments, the method of packet scheduling may be for video streaming based on the 3GPP Long Term Evolution (LTE) interface protocol.

The packet scheduling, controlling scheduling of the packet, and the priority value may be defined as above.

The terms "type of frame" and "setting" may also be as defined above.

In various embodiments, determining the priority value 902 may include determining the priority value further based on a condition of a channel for packet transmission, and a delay value indicating an amount of delay for transmitting the packet.

The condition of the channel may relate to a channel rate of the communication device.

The channel rate, the delay value, and the communication device may be as defined above.

In various embodiments, upon determining the priority value of the packet 902, controlling scheduling of the packet 904 may further include selecting a resource block and assigning to the resource block the communication device which has the largest channel rate as compared to those of other communication devices in the wireless network.

Determining the priority value 902 may include deriving the priority value using a mathematical function which is selected based on a type of traffic scheduled for the packet.

The term "priority value" may be as defined above and may also relate to the utility function (mathematical function) as described above.

In various embodiments, Determining the priority value 902 may include assigning a priority value of higher priority to the packet when the packet is from a real-time video stream or a voice-over-IP (VoIP) stream as compared to when the packet is from a non-real-time data with a rate constraint.

In an embodiment, when the packet is from a non-real-time data with a rate constraint, determining the priority value 902 may include deriving the priority value using a mathematical function and converting the rate constraint to a delay constraint.

In various embodiments, the method 900 may further include controlling scheduling of a BE traffic.

In various embodiments, the method 900 may further include extracting and decoding header information of the packet.

The header information may be as defined above.

In some embodiments, the method 900 may further include determining the position of the video frame in the group of pictures (GOP) for the packet. The video frame may include a plurality of P frames or a plurality of I frames.

In various embodiments, determining the priority value 902 may include establishing for the plurality of P frames a linearly decreasing priority value of each P frame.

In various embodiments, determining the priority value 902 may include establishing for each of the plurality of P frames a priority value of higher priority than that of each of the plurality of I frames. As used herein, the establishment of a priority value of each of the plurality of P frames or I frames may refer to the establishment of an importance value (level) of each of the plurality of P frames or I frames.

For example, the method 900 may include assigning the importance value of the I frame to be about 50% of the highest P frame importance level. This means that determining the priority value 902 may include setting the priority value of the packet including the I frame data, the priority value indicating to be about 50% of the highest priority value of the packet including the P frame data. In some examples, the priority value including the I frame data may be but is not limited to be set to a percentage value as described hereinabove of the highest priority value of the packet including the P frame data.

Examples provide evaluating the performance of the scheduler in accordance to various embodiments on a LTE system simulator which was modified from the Vienna LTE System Level Simulator v1.3r427, as follow.

Simulation Setup

The main simulation parameters used in the LTE system simulator are summarized in Table 1.

TABLE 1

| Parameter | Value |
|---|---|
| No. of sessions | 50 |
| Simulation length | 10 s |
| Physical Detail | Carrier Frequency: 2 GHz; Bandwidth for the DL: 5 MHz; Symbol for TTI: 14; Subframe length: 1 ms; Subcarriers per RB: 12; Subcarrier spacing: 15 kHz; eNodeB: Power transmission = 43 dBm equally distributed among sub-channels; 2 TX and 2 RX antennas with ZF detector; Modulation Scheme: QPSK, 16QAM, and 64QAM with all available coding rates target BLER: 10% |
| Overhead | CRC: 3 bytes PDCCH: 3 OFDM symbols |
| ARQ | No. of RLC ARQ retransmissions: 0 No. of HARQ retransmissions: 4 |
| CQI | No. of RBs per CQI: 1 Measured period: 2 ms |
| Number of UEs | 30 |
| Traffic Model | Video time traffic type: H.264 (10 UEs with 300 kbps and 10 UEs with 100 kbps); Best effort flows: infinite buffer (10 UEs). |

The simulator is based on multi-cells layout. Each eNodeB is surrounded by multiple rings of eNodeBs. The transmit power of each eNodeB is set to 20 W (43 dBm) for a cell radius of 500 m and 5 MHz channel. In the simulator, only 2 rings of eNodeBs were used. Mobility of each UE is described by ITU Ped B with speed of 5 km/h.

The traffic transmitted by the eNodeB on the downlink is made by a mix of 10 H.264 video flows of 300 kbps, 10 H.264 video flows of 100 kbps, and 10 data flows related to best effort service. Each UE hosts a single video flow or a best effort traffic flow with constant packet size of 1000 bytes.

For the video flow, video traces encoded from the H.264/AVC Joint Model Reference Software ver. 12 was used. The encoding parameters related to the video quality are presented in Table 2.

TABLE 2

| Encoding Parameter | Value |
|---|---|
| Profile | Baseline |
| Target bitrate | 100 kbps and 300 kbps |
| Frame rate | 20 fps |
| GOP size | 30 |
| Sequence type | IPPP . . . P |

Each frame is divided into multiple video packets of equal size, which does not exceed 1000 bytes. For example, if the size of P frame is slightly more than 1000 bytes, it is packetized into two P packets with around 500 bytes each.

The number of I packets per frame is approximately ten times larger than the number of P packets per frame. The inter-arrival time of the frame length is 50 ms. The first arrival time from the beginning of a frame, as well as the subsequent inter-arrival times are independently drawn from a Pareto distribution with exponent 1.2 and truncated to [2.5 ms, 12.5 ms]. The out-of-sequence arrival and the loss of the packets due to network layers were not modeled.

Finally, each simulation run lasts 10 s and all simulation outcomes were compiled over 50 sessions.

Schedulers for Performance Comparison

The following scheduling algorithms are used for performance comparison with the scheduler in accordance to various embodiments.

Proportional Fair (PF) algorithm was introduced to compromise between a fair data rate for each user and the total data rate. PF is a suitable scheduling option for non-real time traffic. The goal is to maximize the total network throughput and to guarantee fairness among flows. At TTI t, it chooses UE k* for transmission as follows:

$$k^* = \mathrm{argmax} \frac{c_{k,n}(t)}{\overline{R}_k(t)} \quad (22)$$

where $\overline{R}_k(t)$ is the mean data rate supported by the channel, which is updated at every TTI t using an exponential filter as follows:

$$\overline{R}_k(t) = (1-\tau_k)\overline{R}_k(t-1) + \tau_k r_k(t-1) \quad (23)$$

where $r_k(t)$ is the rate allocated to UE k at TTI t, and $r_k \in (0,1)$ is a user specific constant.

Maximum-largest weighted delay first (LD) is an algorithm designed to support multiple real time data users in CDMA-HDR systems. This algorithm takes into account instantaneous channel variations and delays in the case of video service. At TTI t, it chooses user (UE) k* such that $$k^* = \arg\max \frac{c_{k,n}(t)}{R_k(t)} \frac{w_k(t)}{W_k}. \quad (24)$$

To make use of the packet importance $a_k$ the LD algorithm and denoted it as VLD was modified.

$$k^* = \arg\max a_k \frac{c_{k,n}(t)}{R_k(t)} \frac{w_k(t)}{W_k} \quad (25)$$

Only VLD may be considered as a cross-layer scheduler since it uses packet importance in the scheduling decision.

Scheduling Performance

Here, the performance of the two groups of schedulers: the PF-type and the U'R-type are compared. The PF-type comprises the PF, LD and VLD schedulers, while U'R-type consists of the U'R ($a_k$=1), VU'R ($a_k$=packet importance) and VU'Rm (the importance level of I packets is half of the highest value) schedulers. The importance value assignment of the packets for VU'R and VU'Rm are given in FIG. 5 and FIG. 6, respectively. The comparison metrics used is the ten percentile peak signal-to-noise ratio (PSNR), i.e., value of PSNR when CDF of PSNR=0.1, of the video flows. Three slow motion video sequences (mother-daughter, news and container), one medium motion sequence (foreman) and one fast motion sequence (soccer) were used for the simulations. The encoding parameters for the H.264 video sequences are listed in Table 2.

FIG. 10 to FIG. 19 show the empirical cumulative density function (CDF) of the PSNR for various schedulers and video flows.

Table 3 lists the ten percentile PSNR values of various schedulers and video flows.

TABLE 3

|  | PF | LD | VLD | U'R | VU'R | VU'Rm |
|---|---|---|---|---|---|---|
| MD | 32.03/31.89 | 32.28/32.64 | 32.00/32.50 | 35.07/34.10 | 35.34/33.71 | 35.41/33.86 |
| News | 30.12/27.33 | 30.60/28.80 | 30.71/29.81 | 31.87/31.92 | 31.63/32.81 | 32.02/32.20 |
| Container | 31.19/34.59 | 31.36/35.02 | 31.56/35.28 | 31.90/35.36 | 31.84/35.54 | 31.90/35.53 |
| Foreman | 26.40/26.90 | 27.45/28.96 | 28.29/30.04 | 29.13/31.19 | 29.33/31.78 | 29.34/31.60 |
| Soccer | 22.20/23.57 | 22.46/24.53 | 23.13/24.78 | 25.84/25.59 | 26.02/26.15 | 26.41/26.90 |

From FIG. 10 to FIG. 19 and Table 3, it is observed that the U'R-type schedulers (U'R, VU'R and VU'Rm) outperform the PF-type schedulers. However, the gain from using video importance information is so straightforward.

The gains of VLD, VU'R and VU'Rm over U'R are summarized in Table 4. Each numerical cell in Table 4 shows the gain at 100 kbps/the gain at 300 kbps. For VLD and VU'R, the conventional assignment method is used based on the maximum importance of I packet=8. For VU'Rm, the alternative assignment method is used based on the importance of I packer=8×0.5=4. For VU'Rm*, if the number of packets for the frame is greater or equal to four, the importance levels of P packets are also reduced by half.

TABLE 4

|  | VLD | VU'R | VU'Rm | VU'Rm* |
|---|---|---|---|---|
| MD | −3.07/−1.60 | 0.28/−0.40 | 0.34/−0.24 | 0.29/−0.08 |
| News | −1.16/−2.11 | −0.25/0.89 | 0.15/0.27 | 0.15/0.27 |
| Container | −0.34/−0.08 | −0.06/0.18 | 0.00/0.16 | 0.00/0.16 |
| Foreman | −0.84/−1.15 | 0.21/0.59 | 0.21/0.41 | 0.21/0.41 |
| Soccer | −2.72/−0.81 | 0.18/0.56 | 0.56/1.31 | 0.56/1.31 |

For VLD, even with importance levels information, it still performs 0.08-3.07 dB worse than U'R. It can also be seen that the assignment of packet importance affects the performance of the schedulers. The VU'R performs better than U'R for faster motion videos (foreman and soccer) by 0.18-0.59 dB. For slower motion video sequences, the gain or loss is dependent on the rate and video content of the video sequences. On the other hand, lower the importance level helps to improve the performance. Except for the 300 kbps mother-daughter video flows, the VU'Rm has achieved positive gains of up till 1.31 dB. Similarly, faster motion video flows see higher gains. A detail analysis found that some of the P frames require more than four packets. The VU'Rm is therefore modified such that it reduces the importance levels by half if the packet number for the P frame is more than four. The performance of this scheduler is shown in the last column of Table 4. For the Container and Foreman video flows, no change in performance is observed because the maximum packet number for P frame is less than three. Although there are P frames for News and Soccer which require more than 4 packets, the ten percentile PSNR performance is not affected. For mother-daughter video, the degradation has decreased to −0.08 dB.

In the context of various embodiments, the term "about" as applied to a numeric value encompasses the exact value and a variance of +/−5% of the value.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A circuit arrangement for a wireless cellular network, the circuit arrangement comprising:
    a determiner configured to determine a priority value of each packet of a plurality of packets based on at least a position of a video frame in a group of pictures (GOP) and a type of the video frame, the video frame or a part thereof being contained in the packet,
        wherein the type of video frame comprises I frame data or P frame data; and
        wherein the determiner is further configured to set the priority value of a packet including I frame data lower than the priority value of at least one other packet including P frame data; and a controller configured to control scheduling of the packet based on the determined priority value for a communication device in a wireless cellular network.

2. The circuit arrangement of claim 1, wherein the determiner operates on a first layer of the wireless network or a part thereof, and the controller operates on a second layer of the wireless network or a part thereof, the first layer being different from the second layer.

3. The circuit arrangement of claim 2, wherein the first layer of the wireless network comprises a Layer 3 (L3).

4. The circuit arrangement of claim 2, wherein the second layer of the wireless network comprises a medium access control (MAC) layer.

5. The circuit arrangement of claim 1, wherein the determiner is configured to determine the priority value further based on a condition of a channel for packet transmission, and a delay value indicating an amount of delay for transmitting the packet.

6. The circuit arrangement of claim 5, wherein the condition of the channel relates to a channel rate of the communication device.

7. The circuit arrangement of claim 6, wherein the channel rate comprises a channel quality indicator.

8. The circuit arrangement of claim 6, wherein upon determining the priority value of the packet, the controller is further configured to select a resource block and assign to the resource block the communication device which has the largest channel rate as compared to those of other communication devices in the wireless network.

9. The circuit arrangement of claim 5, wherein the delay value comprises a Head of Line (HOL) delay.

10. The circuit arrangement of claim 9, wherein the priority value has a relationship with the HOL delay based on a decreasing function or a concave function or a convex function.

11. The circuit arrangement of claim 9, wherein the priority value has a relationship with an overall distortion caused by a loss of packet ($D_k$) based an increasing function.

12. The circuit arrangement of claim 1, wherein the priority value is derived using a mathematical function which is selected based on a type of traffic scheduled for the packet.

13. The circuit arrangement of claim 12, wherein the mathematical function is a sigmoidal-like function.

14. The circuit arrangement of claim 1, wherein the packet is from a non-real-time data with a rate constraint, and wherein the priority value is derived using a mathematical function which converts the rate constraint to a delay constraint.

15. The circuit arrangement of claim 1, wherein the determiner is configured to set the priority value of the packet including the I frame data, the priority value indicating to be about 50% of the highest priority value of the packet including the P frame data.

16. A method of determining a priority of packet scheduling in a wireless cellular network comprising a plurality of communication devices, the method comprising:

determining a priority value of each packet of a plurality of packets based on at least a position of a video frame in a group of pictures (GOP) and a type of the video frame, the video frame or a part thereof being contained in the packet, wherein the type of video frame comprises I frame data or P frame data; and wherein determining the priority value further comprising setting the priority value of a packet including I frame data lower than the priority value of at least one other packet including P frame data; and controlling scheduling of the packet based on the determined priority value for a communication device in a wireless cellular network.

17. The method of claim 16, wherein determining the priority value comprises determining the priority value on a first layer of the wireless network, and controlling scheduling of the packet comprises controlling scheduling of the packet on a second layer, the first layer being different from the second layer.

18. The method of claim 16, wherein determining the priority value comprises assigning a priority value of higher priority to the packet when the packet is from a real-time video stream or a voice-over-IP (VoIP) stream as compared to when the packet is from a non-real-time data with a rate constraint.

19. The method of claim 16, wherein when the packet is from a non-real-time data with a rate constraint, determining the priority value comprises deriving the priority value using a mathematical function and converting the rate constraint to a delay constraint.

20. The method of claim 16, wherein determining the priority value comprises establishing for a plurality of P frames of the video frame a linearly decreasing priority value of each P frame of a plurality of P frames of the video frame.

* * * * *